(12) United States Patent
Tsuyuzaki et al.

(10) Patent No.: US 9,652,078 B2
(45) Date of Patent: May 16, 2017

(54) DISPLAY DEVICE

(71) Applicant: Japan Display Inc., Minato-ku (JP)

(72) Inventors: Seiichi Tsuyuzaki, Tokyo (JP);
Masahiro Tokita, Tokyo (JP)

(73) Assignee: Japan Display Inc., Minato-ku (JP)

( * ) Notice: Subject to any disclaimer, the term of this patent is extended or adjusted under 35 U.S.C. 154(b) by 118 days.

(21) Appl. No.: 14/663,662

(22) Filed: Mar. 20, 2015

(65) Prior Publication Data

US 2015/0268796 A1    Sep. 24, 2015

(30) Foreign Application Priority Data

Mar. 24, 2014  (JP) ................................ 2014-060183

(51) Int. Cl.
  *G06F 3/041*    (2006.01)
  *G06F 3/044*    (2006.01)
(52) U.S. Cl.
  CPC ............ *G06F 3/0418* (2013.01); *G06F 3/044* (2013.01); *G06F 3/0412* (2013.01)
(58) Field of Classification Search
  CPC ...... G06F 3/044; G06F 3/0416; G06F 3/0418; G06F 3/03545; G06F 3/0412; G06F 3/0488; G06F 1/1626; G06F 1/3231; G06F 2203/04104; G06F 3/017; G09G 2354/00; G09G 2310/04; G09G 2320/0238; G09G 2320/0626; G09G 2330/021; G09G 2330/022; G09G 2340/0435
  See application file for complete search history.

(56) References Cited

U.S. PATENT DOCUMENTS

| 8,319,737 | B2 | 11/2012 | Noguchi et al. |
| 2010/0295824 | A1* | 11/2010 | Noguchi ............. G02F 1/13338 345/175 |
| 2013/0234978 | A1* | 9/2013 | Ksondzyk ............... G06F 3/044 345/174 |
| 2013/0234985 | A1* | 9/2013 | Huang .................. G06F 3/0418 345/174 |

FOREIGN PATENT DOCUMENTS

JP    2009-258182    11/2009

* cited by examiner

*Primary Examiner* — Duc Dinh
(74) *Attorney, Agent, or Firm* — Oblon, McClelland, Maier & Neustadt, L.L.P.

(57) ABSTRACT

A display device is configured to (a) detect presence or absence of noise or water droplet adhesion based on current flowing through a plurality of detection electrodes upon supply of a touch panel scanning voltage to m divided blocks of the counter electrode, and (b) distinguish between noise and water droplet based on the current flowing through the detection electrodes on the assumption that a (m+1)th counter electrodes exists in addition to the m divided blocks of the counter electrode, and the touch panel scanning voltage is supplied to the (m+1)th counter electrode, which is in synchronization with the touch panel scanning voltage supplied to the m divided blocks of the counter electrode.

18 Claims, 22 Drawing Sheets

| REGISTER NAME | PARAMETER | /VALUE RANGE/UNIT |
|---|---|---|
| TPC_TXDLY [5:0] | t_txdly | 0 to 18.00us (IN UNITS OF 0.286us) |
| TPC_TXMAXD [5:0] | t_txmaxd | 0 to 18.00us (IN UNITS OF 0.286us), t_txdly < t_txmaxd |

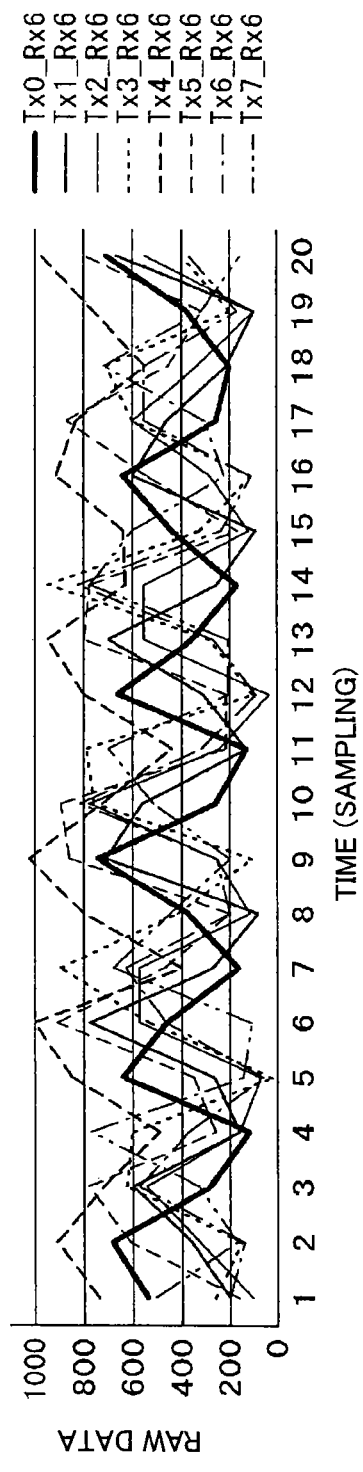
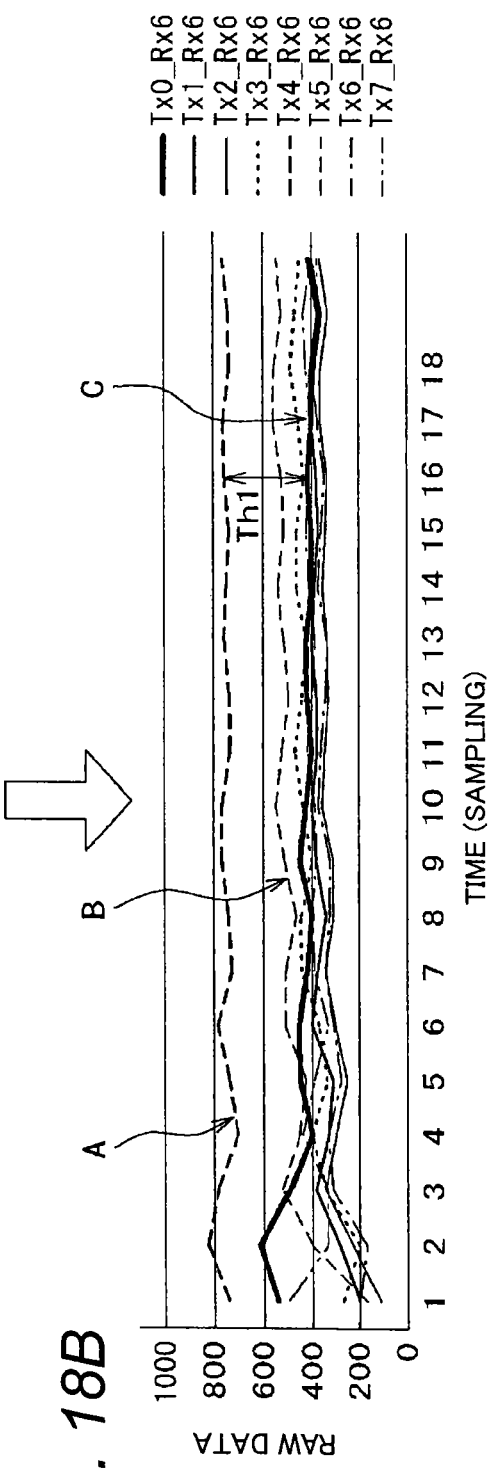
FIG. 18A
FIG. 18B

|  | Rx1 | Rx2 | Rx3 | Rx4 | Rx5 | Rx6 | Rx7 | Rx8 | Rx9 |
|---|---|---|---|---|---|---|---|---|---|
| Tx1 | 294 | 313 | 322 | 303 | 338 | 324 | 283 | 306 | 318 |
| Tx2 | 318 | 245 | 234 | 398 | 488 | 370 | 234 | 247 | 307 |
| Tx3 | 307 | 117 | 268 | 413 | 382 | 416 | 291 | 107 | 268 |
| Tx4 | 298 | 279 | 367 | 236 | 214 | 247 | 349 | 349 | 321 |
| Tx5 | 339 | 425 | 267 | 140 | 96 | 131 | 242 | 413 | 372 |
| Tx6 | 354 | 359 | 181 | 49 | 26 | 38 | 137 | 349 | 331 |
| Tx7 | 371 | 387 | 238 | 118 | 58 | 86 | 197 | 396 | 359 |
| Tx8 | 277 | 391 | 331 | 213 | 155 | 196 | 290 | 376 | 312 |
| Tx9 | 292 | 137 | 383 | 352 | 300 | 347 | 404 | 128 | 264 |
| Tx10 | 340 | 221 | 227 | 347 | 553 | 560 | 314 | 186 | 336 |
| Tx11 | 342 | 334 | 331 | 326 | 363 | 376 | 310 | 329 | 313 |
| Tx12 | 332 | 344 | 332 | 311 | 321 | 356 | 342 | 346 | 335 |
| Tx13 | 340 | 325 | 347 | 316 | 349 | 332 | 332 | 327 | 326 |

|  | Rx1 | Rx2 | Rx3 | Rx4 | Rx5 | Rx6 | Rx7 | Rx8 | Rx9 |
|---|---|---|---|---|---|---|---|---|---|
| Tx1 | 294 | 319 | 322 | 303 | 338 | 324 | 283 | 306 | 318 |
| Tx2 | 318 | 245 | 234 | 398 | 488 | 370 | 234 | 247 | 307 |
| Tx3 | 307 | 117 | 268 | 413 | 382 | 416 | 291 | 107 | 268 |
| Tx4 | 298 | 279 | 367 | 236 | 214 | 247 | 349 | 349 | 321 |
| Tx5 | 339 | 425 | 267 | 140 | 96 | 131 | 242 | 413 | 372 |
| Tx6 | 354 | 359 | 181 | 49 | 26 | 38 | 137 | 349 | 331 |
| Tx7 | 371 | 387 | 238 | 118 | 58 | 86 | 197 | 396 | 359 |
| Tx8 | 277 | 391 | 331 | 213 | 155 | 196 | 290 | 376 | 312 |
| Tx9 | 292 | 137 | 383 | 352 | 300 | 347 | 404 | 128 | 264 |
| Tx10 | 340 | 221 | 227 | 347 | 553 | 560 | 314 | 186 | 336 |
| Tx11 | 342 | 334 | 331 | 326 | 363 | 376 | 310 | 329 | 313 |
| Tx12 | 332 | 344 | 332 | 311 | 321 | 356 | 342 | 346 | 335 |
| Tx13 | 340 | 325 | 347 | 316 | 349 | 332 | 332 | 327 | 326 |

|  | Rx1 | Rx2 | Rx3 | Rx4 | Rx5 | Rx6 | Rx7 | Rx8 | Rx9 |
|---|---|---|---|---|---|---|---|---|---|
| Tx1 | 271 | 296 | 314 | 314 | 375 | 324 | 280 | 294 | 304 |
| Tx2 | 296 | 291 | 312 | 529 | 781 | 468 | 325 | 307 | 290 |
| Tx3 | 302 | 286 | 305 | 626 | 1009 | 683 | 303 | 276 | 270 |
| Tx4 | 276 | 272 | 285 | 358 | 630 | 440 | 308 | 286 | 299 |
| Tx5 | 300 | 278 | 279 | 281 | 324 | 308 | 298 | 282 | 299 |
| Tx6 | 317 | 271 | 169 | 262 | 528 | 295 | 172 | 293 | 294 |
| Tx7 | 302 | 226 | 112 | 346 | 283 | 357 | 269 | 286 | 306 |
| Tx8 | 254 | 286 | 383 | 185 | 67 | 181 | 386 | 300 | 301 |
| Tx9 | 295 | 392 | 476 | 91 | 0 | 95 | 365 | 310 | 276 |
| Tx10 | 344 | 400 | 415 | 251 | 186 | 262 | 281 | 312 | 345 |
| Tx11 | 321 | 296 | 205 | 368 | 437 | 361 | 185 | 308 | 300 |
| Tx12 | 320 | 332 | 317 | 308 | 321 | 337 | 327 | 334 | 328 |
| Tx13 | 328 | 315 | 334 | 308 | 331 | 312 | 323 | 319 | 317 |

T3 points to Rx5/Rx6 area; T4 indicated near Tx5-Tx6.

FIG. 32

|  | Rx1 | Rx2 | Rx3 | Rx4 | Rx5 | Rx6 | Rx7 | Rx8 | Rx9 |
|---|---|---|---|---|---|---|---|---|---|
| Tx1 | 271 | 296 | 314 | 314 | 375 | 324 | 280 | 294 | 304 |
| Tx2 | 296 | 291 | 312 | 529 | 781 | 468 | 325 | 307 | 290 |
| Tx3 | 302 | 286 | 305 | 626 | 1009 | 683 | 303 | 276 | 270 |
| Tx4 | 276 | 272 | 285 | 358 | 630 | 440 | 308 | 286 | 299 |
| Tx5 | 300 | 278 | 279 | 281 | 324 | 308 | 298 | 282 | 299 |
| Tx6 | 317 | 271 | 169 | 262 | 528 | 295 | 172 | 293 | 294 |
| Tx7 | 302 | 226 | 112 | 346 | 283 | 357 | 269 | 286 | 306 |
| Tx8 | 254 | 286 | 383 | 185 | 67 | 181 | 386 | 300 | 301 |
| Tx9 | 295 | 392 | 476 | 91 | 0 | 95 | 365 | 310 | 276 |
| Tx10 | 344 | 400 | 415 | 251 | 186 | 262 | 281 | 312 | 345 |
| Tx11 | 321 | 296 | 205 | 368 | 437 | 361 | 185 | 308 | 300 |
| Tx12 | 320 | 332 | 317 | 308 | 321 | 337 | 327 | 334 | 328 |
| Tx13 | 328 | 315 | 334 | 308 | 331 | 312 | 323 | 319 | 317 |

AR3 indicates Rx5/Rx6 column region; T3 (TT); T4 (NT); AR4.

DISPLAY DEVICE

CLAIM OF PRIORITY

The present application claims priority from Japanese patent application JP2014-060183 filed on Mar. 24, 2014, the content of which is hereby incorporated by reference into this application.

BACKGROUND

The present invention relates to a display device, which is applicable to an in-cell type display device with a built-in touch panel, for example.

The display device that includes a device (hereinafter referred to as a touch sensor or a touch panel) for inputting information by touching (contact-pressing operation, hereinafter simply referred to as touch) the display screen with a user's finger or a pen has been applied to the mobile electronic device such as PDA and mobile terminal, various kinds of household electric appliances, and ATM (Automated Teller Machine).

The touch panel of electrostatic capacitance type has been known as the one for detecting the capacitance change in the touched part.

JP-A-2009-258182 discloses the in-cell type liquid crystal display device with a touch panel function built in the liquid crystal display panel as the electrostatic capacitance type touch panel.

The in-cell type liquid crystal display device is configured to use the scanning electrode of the touch panel formed by dividing the counter electrode (common electrode) formed on the first substrate (TFT substrate) that constitutes the liquid crystal display panel.

SUMMARY

In a certain case, the foreign matter such as noise and water droplet may cause erroneous capacitance detection. A touch detection based on the result of the erroneous capacitance detection further results in the touch detection error (imaginary touch detection). It is therefore necessary to avoid the aforementioned error.

The technique capable of lessening the influence of the imaginary touch "ghost" on touch detection is applied to the display device having the built-in touch panel function.

Any other task and advantageous characteristics will be apparent by the description and the accompanying drawings.

The present invention provides the display device which includes a first substrate having a pixel electrode and a counter electrode, a second substrate having a plurality of detection electrodes of a touch panel, a liquid crystal interposed between the first substrate and the second substrate, a drive circuit for supplying a counter voltage and a touch panel scanning voltage to the counter electrode, and a detection circuit for detecting presence or absence of a touch based on a current flowing through the detection electrodes. The counter electrode is divided into m blocks, where m is set to an integer equal to or larger than 2 (m≥2). The m divided blocks of the counter electrode are commonly provided to pixels on a plurality of consecutive display lines. The m divided blocks of the counter electrode serve as scanning electrodes of the touch panel. The drive circuit sequentially supplies the touch panel scanning voltage to the m divided blocks of the counter electrode. The detection circuit is configured to (a) detect presence or absence of noise or water droplet adhesion based on the current flowing through the detection electrodes upon supply of the touch panel scanning voltage to the m divided blocks of the counter electrode; and (b) distinguish between noise and water droplet based on the current flowing through the detection electrodes on the assumption that a (m+1)th counter electrode exists in addition to the m divided blocks of the counter electrode, and the touch panel scanning voltage is supplied to the (m+1)th counter electrode, which is in synchronization with the touch panel scanning voltage supplied to the m divided blocks of the counter electrode.

BRIEF DESCRIPTION OF THE DRAWINGS

FIG. 18A is a graph showing RAW data of the detection electrode of the touch panel according to the first embodiment, from which the noise is detected;

FIG. 18B is a graph showing data acquired after application of average filtering;

FIG. 31 is an explanatory view of the averaging process executed in the case where the panel to which the water droplet adheres is touched by the finger; and FIG. 32 is an explanatory view of the averaging process executed in the case where the panel to which the water droplet adheres is touched by the finger.

DESCRIPTION OF THE PREFERRED EMBODIMENTS

Figure 1:
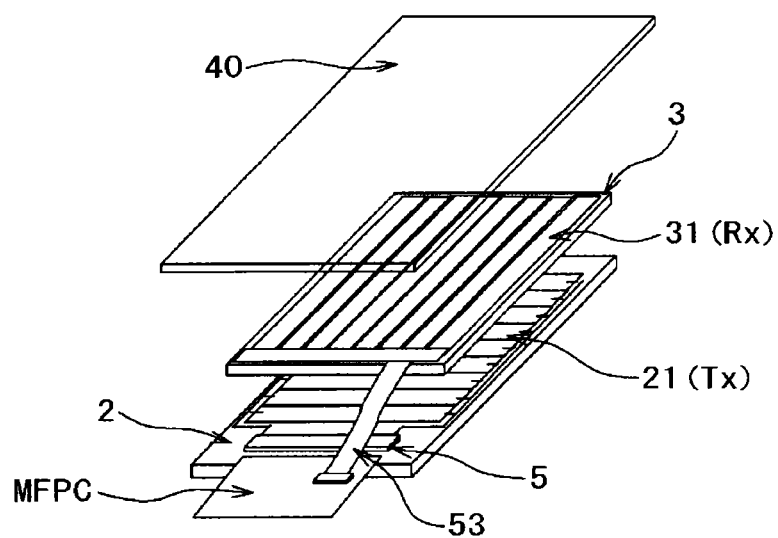
FIG. 1 is an exploded perspective view schematically showing a structure of an in-cell type liquid crystal display device with a touch panel built inside a liquid crystal display panel.

Embodiments will be described referring to the drawings. It is to be noted that the disclosure is one of examples, and appropriate modification which can be easily derived by the person skilled in the art while being consistent with the subject of the invention is within the scope of the present invention. Each width, thickness, and shape of the respective components may be schematically expressed in comparison with the actual configuration for the purpose of clarifying the explanation. In this case, the drawing is also one of examples and is not designed to limit understanding of the present invention. The elements which have been once explained referring to the drawings will be designated with the same codes, and detailed explanations thereof, thus will be omitted.

The in-cell type liquid crystal display device will be described referring to FIGS. 1 to 13.

FIG. 1 is an exploded perspective view schematically showing the structure of the in-cell type liquid crystal display device with a touch panel built in the liquid crystal display panel.

FIG. 1 shows a first substrate 2 (hereinafter referred to as TFT substrate), a second substrate 3 (hereinafter referred to as CF substrate), a counter electrode 21 (common electrode), a liquid crystal driver IC 5, a main flexible wiring substrate MFPC, a front window 40, and a connection flexible wiring substrate 53.

The liquid crystal display device shown in FIG. 1 is configured to form a detection electrode 31 of the touch panel by dividing a transparent conductive film (CD) on the CF substrate 3 at a back surface side into belt-like patterns, and to divide the counter electrode 21 formed inside the TFT substrate 2 into belt-like patterns, that is, a plurality of blocks so as to be used as the scanning electrode of the touch panel. This makes it possible to reduce the number of touch panel substrates for the generally employed touch panel. The liquid crystal display device shown in FIG. 1 is configured to install the circuit for driving the touch panel inside a liquid crystal driver IC 5.

The counter electrode 21 and the detection electrode 31 of the liquid crystal display device shown in FIG. 1 will be described referring to FIG. 2.

As described above, a plurality of counter electrodes 21 (for example, 32 electrodes) disposed on the TFT substrate 2 are commonly connected at both sides so as to be connected to a counter electrode signal line 22.

Figure 2:
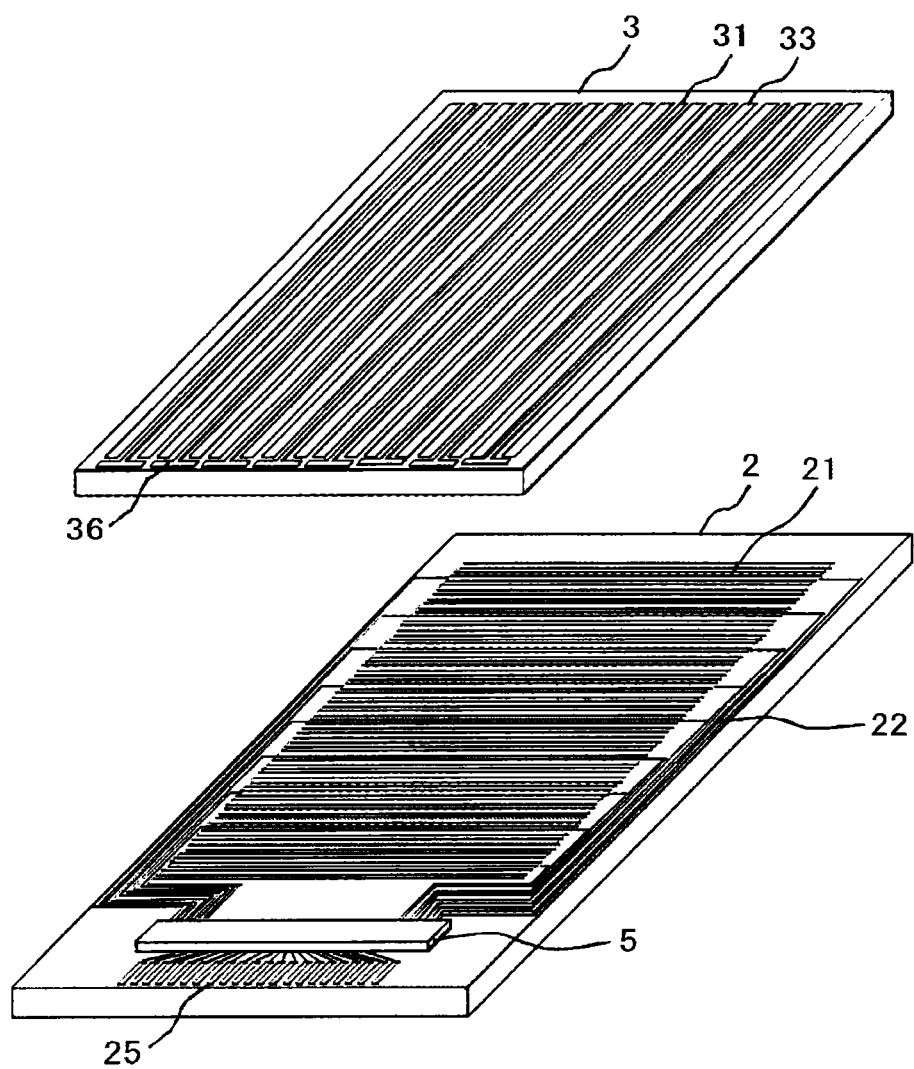
FIG. 2 is an explanatory view representing a counter electrode and a detection electrode of the liquid crystal display device shown in FIG. 1.

The liquid crystal display device shown in FIG. 2 is configured to have each of the belt-like counter electrodes 21 serving as the scanning electrode (Tx), and the detection electrode 31 constituting the detection electrode (Rx).

Therefore, a counter electrode signal contains information on the counter voltage used for image display and a touch panel scanning voltage used for touch position detection. Upon application of the touch panel scanning voltage to the counter electrode 21, the detection electrode 31 that is arranged at a predetermined interval from the counter electrode 21 and constitutes the capacitor generates the detection signal. The detection signal is then extracted outside via a detection electrode terminal 36.

Dummy electrodes 33 are formed at both sides of the detection electrode 31. At one end of the detection electrode 33, a T-like detection electrode terminal 36 is formed, which extends toward the dummy electrode 33. Besides the counter electrode signal line 22, various types of wirings and terminals, for example, a drive circuit input terminal 25 are formed on the TFT substrate 2.

Figure 3:
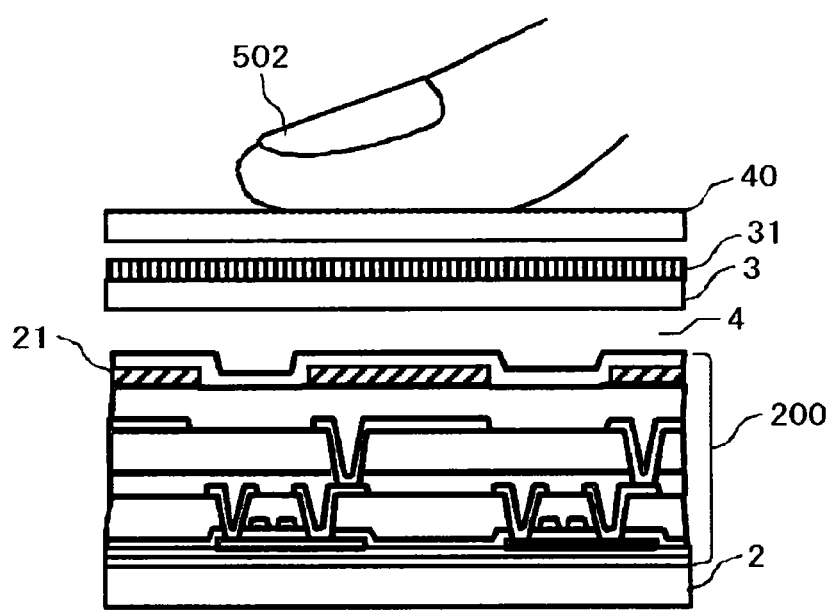
FIG. 3 is a partially enlarged sectional view of a display part of the liquid crystal display device shown in FIG. 1.

FIG. 3 is a schematic sectional view of an enlarged cross-section of the display part of the liquid crystal display device shown in FIG. 1.

Referring to FIG. 3, a pixel part 200 is formed on the TFT substrate 2, and the counter electrode 21 is used for image display as a part of the pixel. A liquid crystal composition 4 is interposed between the TFT substrate 2 and the CF substrate 3. The detection electrode 31 of the CF substrate 3 and the counter electrode 21 of the TFT substrate 2 constitute a capacity so that the voltage of the detection electrode 31 changes upon application of the drive signal to the counter electrode 21.

At this time, when the conductor, for example, a finger 502 gets close to or in contact with the electrode via a front window 40 as shown in FIG. 3, the capacity changes to vary the voltage generated in the detection electrode 31 in comparison with the state with no approaching nor contact.

In this way, detection of the capacity change between the counter electrode 21 and the detection electrode 31 of the liquid crystal display panel ensures to impart the touch panel function to the liquid crystal display panel.

Figure 4:
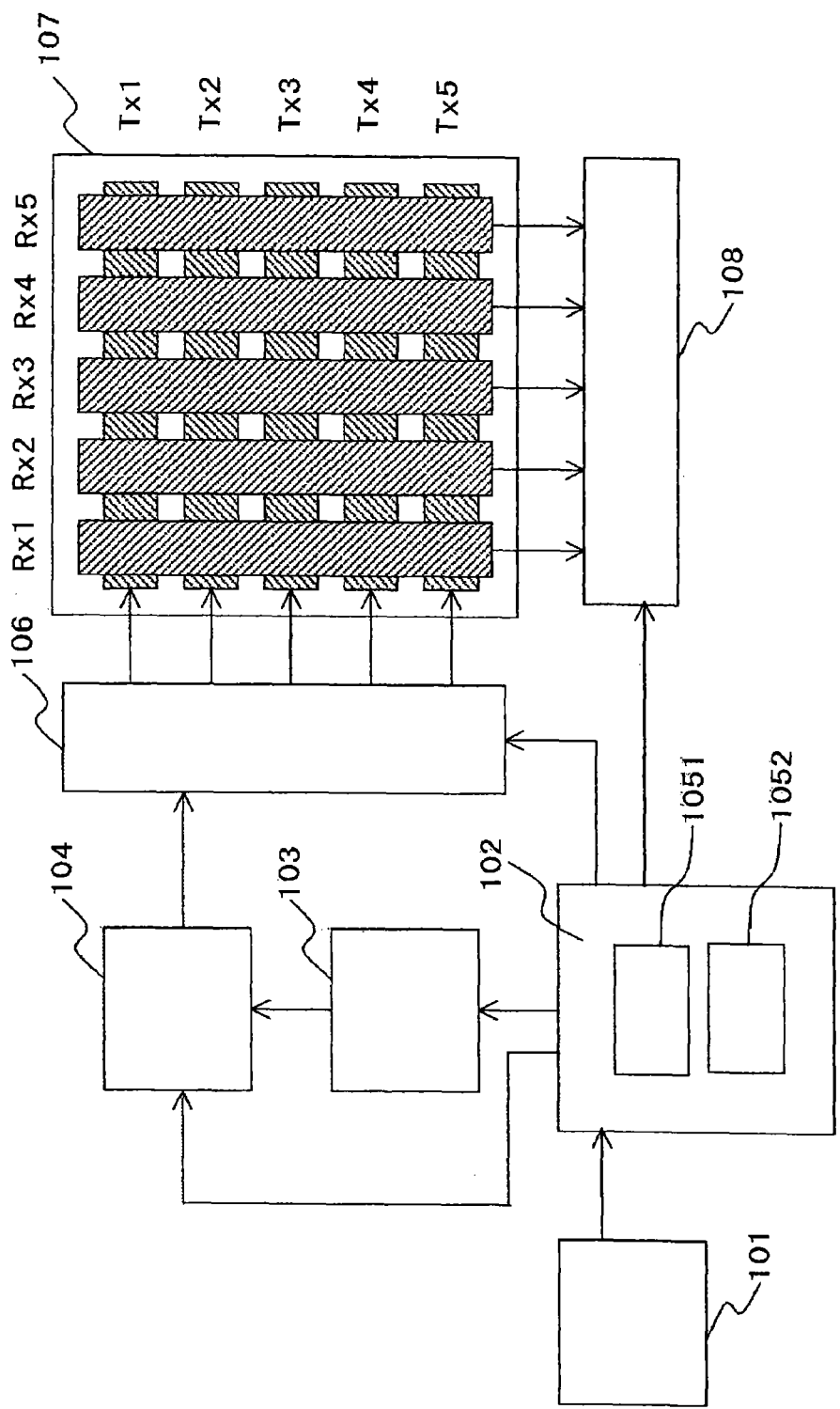
FIG. 4 is a block diagram schematically showing a general structure of a touch panel of the in-cell type liquid crystal display device according to the present invention.

FIG. 4 is a block diagram schematically showing a general structure of the touch panel of the in-cell type liquid crystal display device according to the present invention.

FIG. 4 shows an LCD driver 101, a sequencer 102, a touch panel scanning voltage generation circuit 103, a delay circuit 104, a decoder circuit 106, a touch panel 107, a detection circuit 108, and registers 1051, 1052.

The touch panel 107 includes an electrode pattern (scanning electrodes (Tx1 to Tx5) and detection electrodes (Rx1 to Rx5)) as the sensor terminal for detecting a user touch.

The in-cell type liquid crystal display device according to the present invention has the touch panel function built in the liquid crystal display panel so that the belt-like counter electrode 21 shown in FIG. 2 serves as the scanning electrode (Tx), and the detection electrode 31 constitutes the detection electrode (Rx).

The LCD driver 101 transmits synchronization signals (vertical synchronization signal (Vsync) and horizontal synchronization signal (Hsync)) to the sequencer 102 for displaying the image on the liquid crystal display panel.

The sequencer 102 controls the touch panel scanning voltage generation circuit 103, the delay circuit 104, the decoder circuit 106, and the detection circuit 108 so that the touch detection timing is controlled.

The touch panel scanning voltage generation circuit 103 generates and outputs a touch panel scanning voltage (Vstc) for driving the scanning electrodes (Tx1 to Tx5).

The delay circuit 104 delays the touch panel scanning voltage (Vstc) input from the touch panel scanning voltage generation circuit 103 by a delay amount in accordance with an instruction from the sequencer 102. The sequencer 102 determines the delay amount based on the parameter stored in the registers (1051, 1052).

The register 1051 stores a unit delay time, and the register 1052 stores the maximum delay time. The unit delay time stored in the register 1051 is the unit time for delaying the touch panel scanning voltage (Vstc) as a parameter that determines the driving cycle of the touch panel scanning voltage (Vstc).

The maximum delay time stored in the register 1052 is defined as the maximum time for delaying the touch panel scanning voltage (Vstc) as the parameter which specifies the allowable range for fluctuating the timing of the touch panel scanning voltage (Vstc).

The decoder circuit 106 is an analog switch (demultiplexer) for outputting the touch panel scanning voltage (Vstc) to one of the scanning electrodes (Tx1 to Tx5) based on the selection signal input from the sequencer 102.

The detection circuit 108 detects an inter-electrode capacitance (mutual capacity) at the intersection between one of the scanning electrodes (Tx1 to Tx5), which has received the touch panel scanning voltage (Vstc), and the respective detection electrodes (Rx1 to Rx5).

Figure 5:
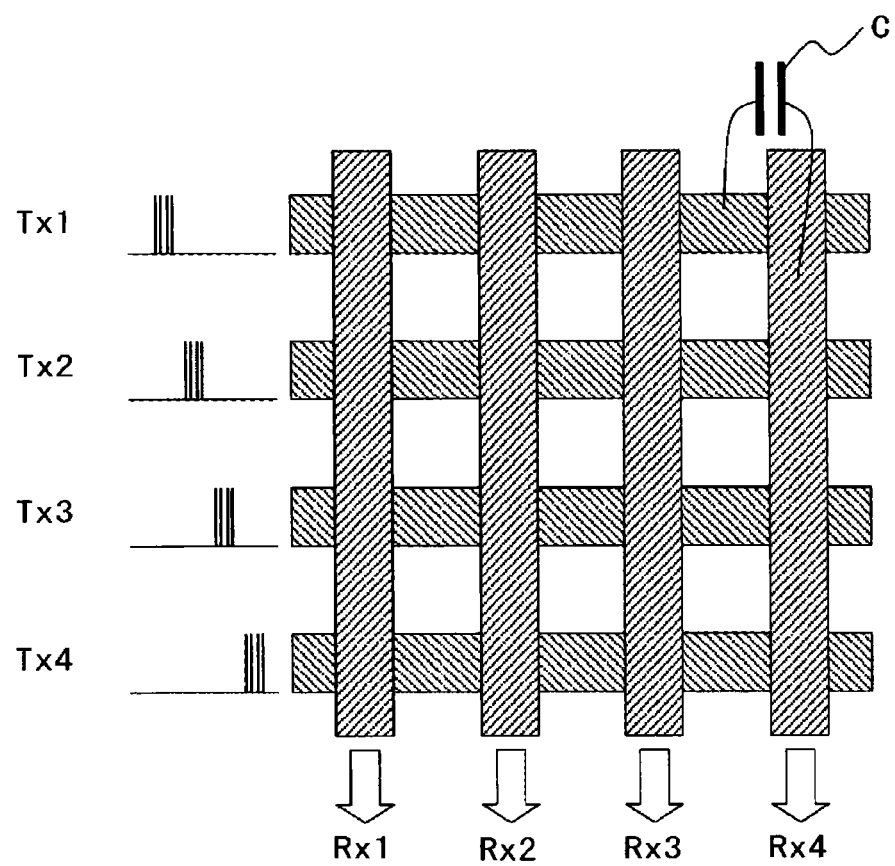
FIG. 5 is an explanatory view of a touch panel detection principle of the in-cell type liquid crystal display device according to the present invention.

FIG. 5 is an explanatory view representing principle of touch panel detection performed in the in-cell type liquid crystal display device according to the present invention.

Figure 6:
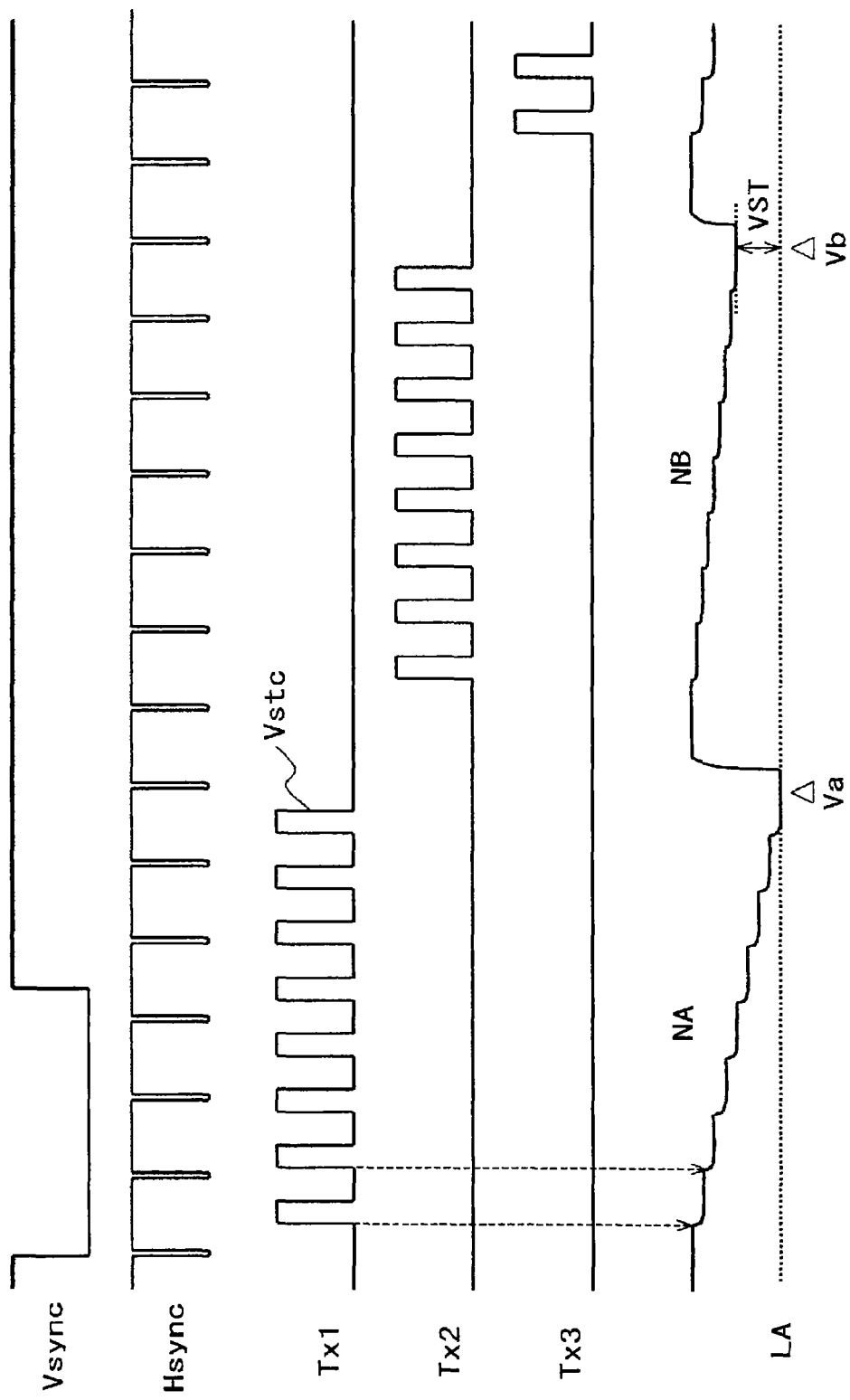
FIG. 6 is a timing chart of a touch detection operated through the touch panel of the in-cell type liquid crystal display device according to the present invention.

FIG. 6 is a timing chart of the touch detection performed in the in-cell type liquid crystal display device according to the present invention.

The sequencer 102 controls the touch panel scanning voltage generation circuit 103 to supply the touch panel scanning voltage (Vstc) sequentially to the scanning electrodes (Tx1 to Tx5) while synchronizing the vertical synchronization signal (Vsync) and the horizontal synchronization signal (Hsync). As FIGS. 5 and 6 show, the touch panel scanning voltage (Vstc) is supplied to the respective scanning electrodes a plurality of times (8 times in FIG. 6).

The code C of FIG. 5 denotes the intersection capacity between the scanning electrode (Tx1) and the detection electrode (Rx4).

Referring to FIG. 6, the detection circuit 108 integrates values of the current applied to the respective detection electrodes (Rx1 to Rx5) (FIG. 6 shows the integration toward the negative direction), and records values of the arriving voltage ($\Delta Va$, $\Delta Vb$).

If the finger (conductor) touches the point around the intersection between the scanning electrode (Tx) and the detection electrode (Rx), the current is applied to the finger, thus changing the voltage value of the integration results.

Referring to FIG. 6, for example, as the finger is not located at the point around the intersection between the scanning electrode (Tx1) and the detection electrode (RxN) (in the untouched state as NA of FIG. 6 shows), the voltage value resulting from integrating the current applied to the detection electrode is brought into the untouched level (LA).

On the contrary, as the finger is located at the point around the intersection between the scanning electrode (Tx2) and the detection electrode (RxN) (in the touched state as NB of FIG. 6 shows), the current is applied to the finger. Therefore, potential of the voltage resulting from integrating the current applied to the detection electrode becomes higher than the untouched level (LA). Use of the amount of change allows detection of the touch position.

Figure 7:
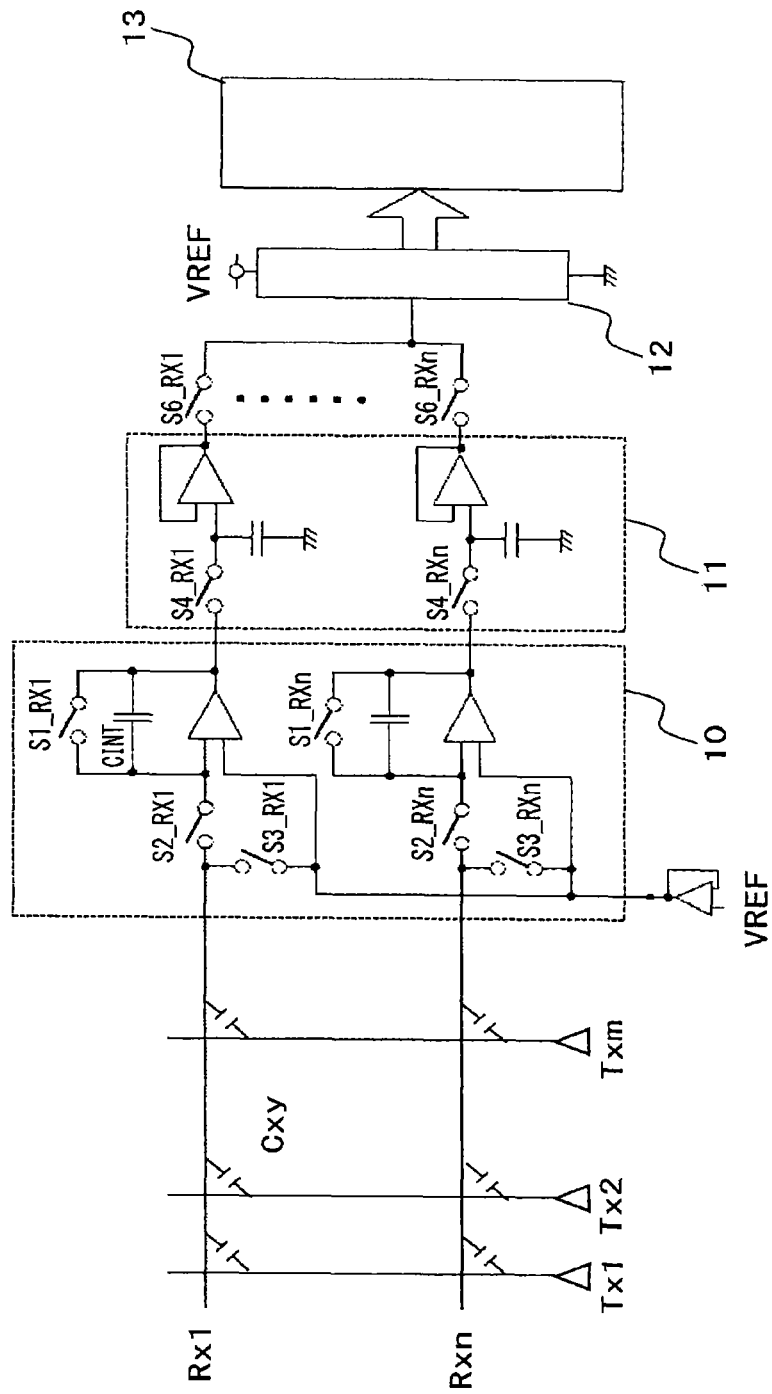
FIG. 7 is a circuit diagram showing a specific circuit structure of the detection circuit shown in FIG. 4.

FIG. 7 is a circuit diagram representing the specific circuit structure of the detection circuit 108 shown in FIG. 4.

Figure 8:
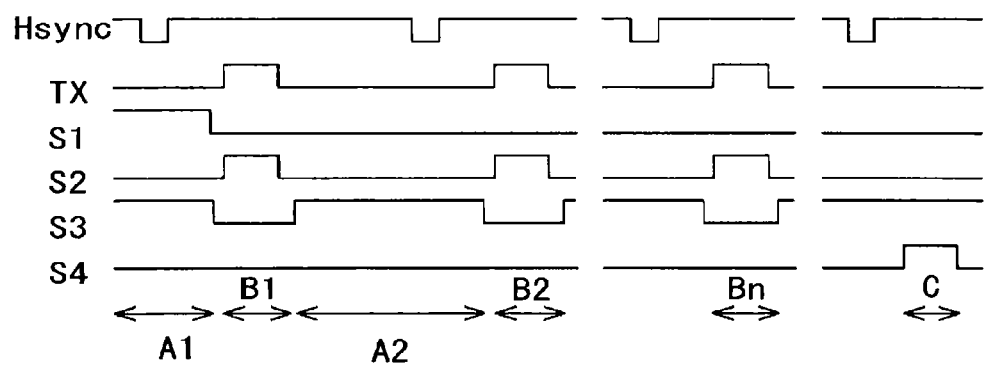
FIG. 8 is a timing chart for explaining operation of the circuit shown in FIG. 7.

FIG. 8 is a timing chart for explaining the operation of the circuit shown in FIG. 7.

FIG. 7 shows an integration circuit 10, a sample hold circuit 11, a 10-bit AD converter 12, and a memory (RAM) 13 which stores the data output from the AD converter 12 (hereinafter referred to as RAW data).

The operation of the circuit shown in FIG. 7 will be described referring to FIG. 8. A code Hsync shown in FIG. 8 denotes the horizontal synchronization signal.

(1) Before detecting (integrating) the current flowing through the respective detection electrodes (Rx1 to Rxn), a switch (S1) is turned ON to reset the integration circuit 10. Then a switch (S3) is turned ON to reset the respective detection electrodes (Rx1 to Rxn) (in the period of A1 shown in FIG. 8).

Assuming that the reference voltage (VREF) is set to 4V (VREF=4V), the integration circuit 10 outputs 4V, and each of the detection electrodes (Rx1 to Rxn) is pre-charged to 4V.

(2) After turning OFF the switches (S1) and (S3), the touch panel scanning voltage (Vstc) is output from one of the scanning electrodes (Tx1 to Txm) so as to execute integration (in the period of B1 shown in FIG. 8) by turning ON the switch (S2) synchronously.

The current is applied on the route through one of the scanning electrodes (Tx1 to Txm), the intersection capacity (Cxy), and the integral capacity (CINT) so that the output voltage (VINT) from the integration circuit 10 is reduced.

The formula VINT=VREF−Vstc*(Cxy/CINT) is established.

(3) At the end of integration executed by the integration circuit 10, the switch (S2) is turned OFF, and the switch (S3) is turned ON. Then each of the detection electrodes (Rx1 to Rxn) is pre-charged to 4V (in the period of A2 shown in FIG. 8).

(4) The integration executed by the integration circuit 10 as described in the process (2) is repeated to accumulate the voltage (in the periods of B2, . . . shown in FIG. 8).

(5) Upon completion of integration executed by the integration circuit 10 (after the elapse of the period Bn shown in FIG. 8), the switch (S4) is turned ON to allow the sample hold circuit 11 to execute the process of sample and hold (in the period of C shown in FIG. 8). Thereafter, the switch (S6) is sequentially turned ON to allow the AD converter 12 to execute AD conversion so that the RAW data corresponding to the scanning electrodes of the respective detection electrodes (Rx1 to Rxn) are stored in the memory (RAM) 13.

If the AD converter 12 is of 10-bit type, the RAW data will be in the range from 0 as the least significant data (0 V of integration) to 1023 as the most significant data (4 V of integration).

(6) As the intersection capacity (Cxy) in the untouched state is larger than that of the touched state, fall of the integrated output voltage (VINT) in the integration circuit 10 may differ as ΔVa, ΔBa of FIG. 6 show. Then the threshold value is provided for the difference so as to execute touch detection.

Generally, in the case where the AD converter 12 is of 10-bit type, the digital data derived from AD conversion of the voltage at ΔVa shown in FIG. 6 is in the range from 250 to 350 in decimal system as the operating point in the normal detection process.

Figure 9:
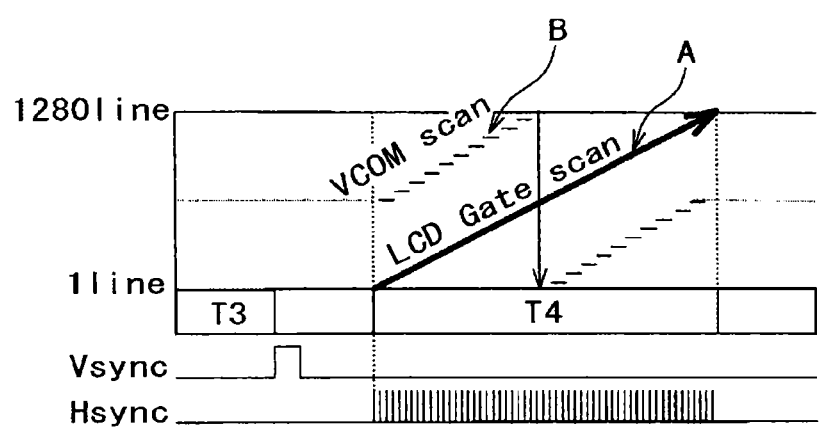
FIG. 9 is an explanatory view explaining each timing of the touch panel detection and pixel writing in the in-cell type liquid crystal display device.

FIG. 9 is an explanatory view showing the touch panel detection timing and the pixel writing timing in the in-cell type liquid crystal display device. Referring to FIG. 9, the code T3 denotes a flyback interval, Vsync denotes the vertical synchronization signal, and Hsync denotes the horizontal synchronization signal.

A line A of FIG. 9 represents the pixel writing timing from the 1st to 1280th display lines of the pixel writing interval (T4) in 1 frame. A line B of FIG. 9 represents the touch panel detection timing of each of 20 blocks formed by dividing the counter electrode.

As FIG. 9 shows, the counter electrode on the arbitrary display line is allowed to function as the scanning electrode (Tx). The scanning operation (VCOM scan) during touch panel detection is performed at a position different from the gate scanning (LCD Gate scan) for pixel writing.

As described referring to FIG. 9, the gate scanning and the touch panel scanning are executed on the different display lines. As a parasitic capacities exist between the video line and the counter electrode 21, and between the scanning line and the counter electrode 21, fluctuation in the video voltage (VDL) on the video line or noise generated upon rise or fall of the scanning voltage may lower the detection sensitivity upon touch panel detection.

In the in-cell type liquid crystal display device according to the present invention, the touch position detection is executed in the period with no fluctuation in the voltage on the video line (VDL), or no rise nor fall of the scanning voltage (VGL).

Figures 10, 11:
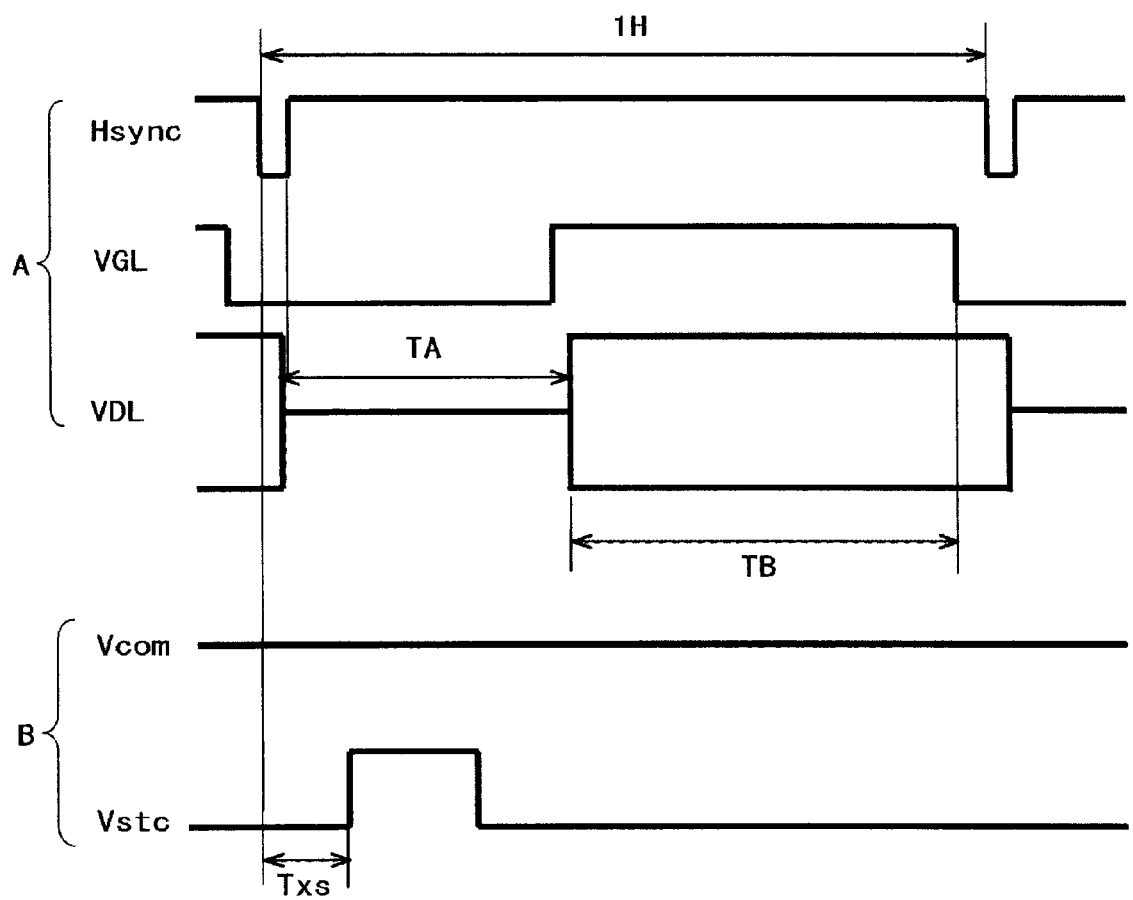
FIG. 10 is a timing chart for driving the liquid crystal display panel and the sensor electrode in the in-cell type liquid crystal display device according to the present invention.
FIG. 11 is a view representing specifications of registers 1051 and 1052 shown in FIG. 4.

FIG. 10 is a timing chart representing each timing of driving the liquid crystal display panel, and the sensor electrode of the in-cell type liquid crystal display device according to the present invention.

Referring to FIG. 10, the code VGL denotes the scanning voltage on the scanning line, VDL denotes the video voltage on the video line, Vcom denotes the counter voltage (common voltage) supplied to the counter electrode 21, Vstc denotes the touch panel scanning voltage, 1H denotes the 1 horizontal scanning period, and Txs denotes the waiting period for the start of touch panel scanning.

As the in-cell type liquid crystal display device according to the present invention employs dot-inversion type AC drive method, the counter voltage becomes the Vcom at constant potential.

It is necessary for the in-cell type liquid crystal display device having the touch panel function built in the liquid crystal display panel to completely execute time division between the display operation of the liquid crystal display panel (A in FIG. 10) and the touch position detection (B in FIG. 10) while controlling synchronously in order to allow the belt-like counter electrode 21 shown in FIG. 2 to serve as the scanning electrode (Tx) for touch detection.

As described above, the in-cell type liquid crystal display device according to the present invention is configured to execute the touch position detection in the period with no fluctuation in the video voltage (VDL) on the video line, or no rise nor fall in the scanning voltage (VGL) in the interval of TA or TB shown in FIG. 10).

FIG. 11 is a table representing specifications of the registers 1051 and 1052 shown in FIG. 4, respectively.

The register named "TPC_TXDLY" shown in FIG. 11 refers to the register 1051 shown in FIG. 4, having a parameter of "unit delay time (t_txdly)" in the range from 0 to 18.00 us in units of 0.286 us.

The register named "TPC_TXMAXD" shown in FIG. 11 refers to the register 1052 shown in FIG. 4, having a parameter of "maximum delay time (t_txmaxd)" set in the range from 0 to 18.00 us in units of 0.286 us. It is necessary to satisfy the condition of t_txdly<t_txmaxd.

Figure 12:
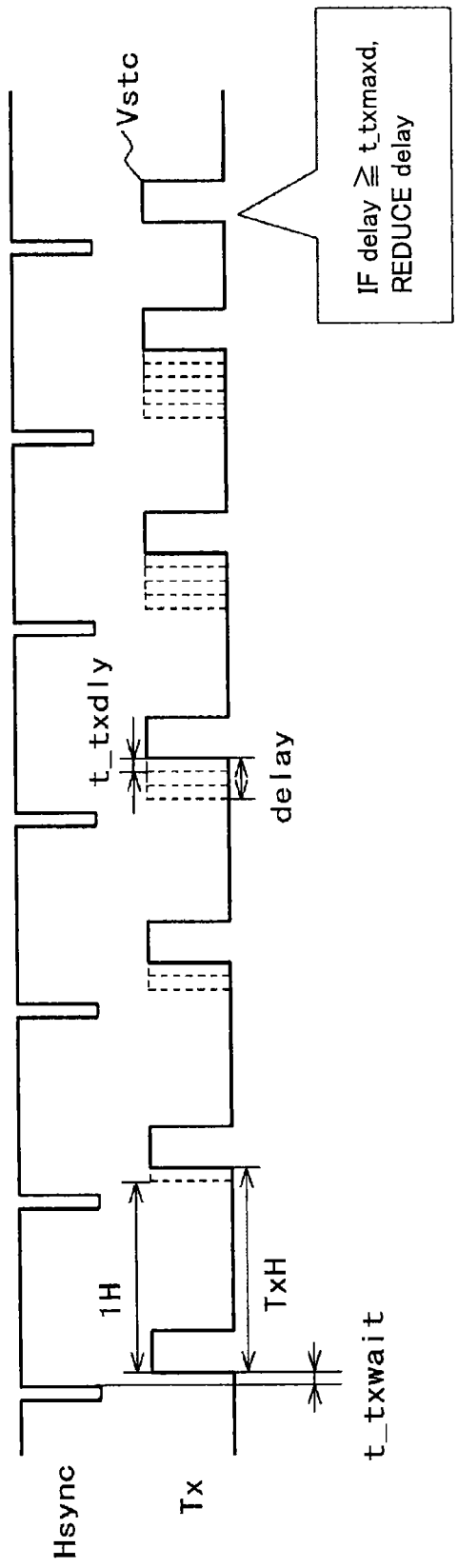
FIG. 12 is a chart representing a touch panel scanning timing in the in-cell type liquid crystal display device according to the present invention.

FIG. 12 shows the timing for scanning the touch panel of the in-cell type liquid crystal display device according to the present invention. Referring to FIG. 12, the code 1H denotes 1 horizontal scanning period, and TxH denotes the touch panel scanning period.

The in-cell type liquid crystal display device according to the present invention is configured to delay the timing for supplying the touch panel scanning voltage (Vstc) to the scanning electrode (Tx) by the unit delay time stored in the register 1051 upon supply of the touch panel scanning voltage (Vstc) to the same scanning electrode (Tx) a plurality of time (32 times, for example) in a plurality of horizontal scanning periods. In this case, it is ensured to prevent the delay time from exceeding the maximum delay time stored in the register 1052.

Referring to FIG. 12, in the in-cell type liquid crystal display device according to the present invention, the timing for supplying the touch panel scanning voltage (Vstc) to the scanning electrode (Tx) is at a time point after an elapse of predetermined waiting period (t_txwait) from a rising point of the horizontal synchronization signal (Hsync) in the first horizontal scanning period. In the second horizontal scanning period, the timing for supplying the touch panel scanning voltage (Vstc) to the scanning electrode (Tx) is at the time point (t_txwait+t_txdly) after an elapse of the time period derived from adding the unit delay time (t_txdly) to the predetermined waiting time (t_txwait) from the rising point of the horizontal synchronization signal (Hsync). In the nth (0≤n≤31) horizontal scanning period, the timing for supplying the touch panel scanning voltage (Vstc) to the scanning electrode (Tx) is at the time point (t_txwait+n×t_txdly) after an elapse of time derived from adding the n×unit delay time (n×t_txdly) to the predetermined waiting time (t_txwait) from the rising point of the horizontal synchronization signal (Hsync).

As described above, in the in-cell type liquid crystal display device according to the present invention, the timing for supplying the touch panel scanning voltage (vstc) to the scanning electrode (Tx) may be expressed as (t_txwait+delay; delay=n×t_txdly) in the n(0≤n≤31)th horizontal scanning period upon supply of the touch panel scanning voltage (Vstc) to the same scanning electrode (Tx) a plurality of times (for example, 32 times) in a plurality of horizontal scanning periods. In the case where the value of (n×t_txdly) is equal to or larger than the maximum delay time (t_txmaxd) (n×t_txdly≥t_txmaxd), the timing may be expressed as (delay=delay−n×t_txdly).

Examples of setting the register (TPC_TXDLY) 1051 and the register (TPC_TXMAXD) 1052 of the in-cell type liquid crystal display device according to the present invention will be described.

Figure 13:
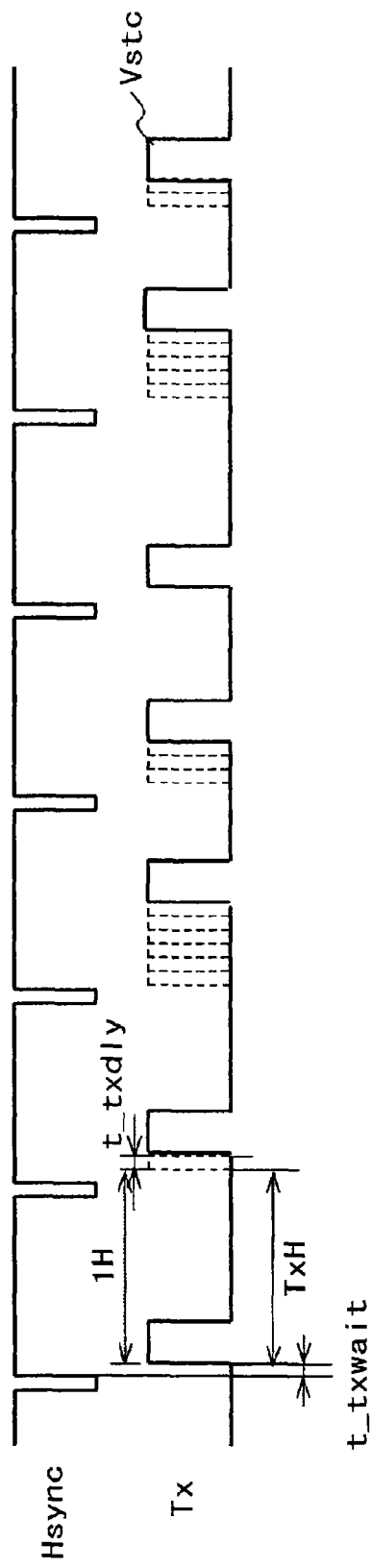
FIG. 13 is a chart as a modified example representing the touch panel scanning timing in the in-cell type liquid crystal display device according to the present invention.

In the case of touch panel scanning period (TxH)>1 horizontal scanning period (1H):

This makes it possible to randomly set the delay time width from the time point after the elapse of the predetermined waiting period (t_txwait) from the rising point of the horizontal synchronization signal (Hsync) to the timing of supplying the touch panel scanning voltage (Vstc) to the scanning electrode (Tx) as shown in FIG. 13.

Table 1 shows each increase or decrease (Δ) from the unit delay time (t_txdly) with respect to the touch panel scanning period (TxH) with the time width set to 0, and each value of the touch panel scanning period (TxH) for the respective values of 16 registers TXDLY1[3:0] to TXDLY16[3:0], that is, TXDLY1=0, TXDLY2=5, TXDLY3=0, TXDLY4=1, TXDLY5=0, TXDLY6=15, TXDLY7=0, TXDLY8=7, TXDLY9=0, TXDLY10=2, TXDLY11=0, TXDLY12=8, TXDLY13=0, TXDLY14=4, TXDLY15=0, TXDLY16=12.

TABLE 1

|  | 1H | 2H | 3H | 4H | 5H | 6H | 7H | 8H | 9H | 10H | 11H | 12H | 13H | 14H | 15H | 16H | 17H | unit |
|---|---|---|---|---|---|---|---|---|---|---|---|---|---|---|---|---|---|---|
| t_txdly | 0 | 5 | 0 | 1 | 0 | 15 | 0 | 7 | 0 | 2 | 0 | 8 | 0 | 4 | 0 | 12 | 0 | clk |
| Δ |  | 5 | −5 | 1 | −1 | 15 | −15 | 7 | −7 | 2 | −2 | 8 | −8 | 4 | −4 | 12 | −12 | cld |
| TxH |  | 31.43 | 28.57 | 30.29 | 29.71 | 34.29 | 25.71 | 32.00 | 28.00 | 30.57 | 29.43 | 32.29 | 27.71 | 31.14 | 28.86 | 33.43 | 26.57 | us |

Example 1 register (TPC_TXDLY)=1, register (TPC_TXMAXD)=5
Delay number=0, 1, 2, 3, 4, 0, 1, . . . .

Example 2 register (TPC_TXDLY)=2, register (TPC_TXMAXD)=5
Delay number=0, 2, 4, 1, 3, 0, 2, . . . .
In the case of touch panel scanning period (TxH)<1 horizontal scanning period (1H):

Example 3 register (TPC_TXDLY)=9, register (TPC_TXMAXD)=10
Delay number=0, 9, 8, 7, 6, 5, 4, 3, 2, 1, 0, 9, . . . .

The method shown in FIGS. 11 and 12 is designed to delay the timing for supplying the touch panel scanning voltage (Vstc) to the scanning electrode (Tx) for 1 horizontal scanning period by the unit delay time stored in the register 1051 so as not to exceed the maximum delay time stored in the register 1052. The following method is also applicable.

A modified example of the in-cell type liquid crystal display device according to the present invention will be described. FIG. 13 is a touch panel scanning timing chart of the modified example of the in-cell type liquid crystal display device according to the present invention.

In the in-cell type liquid crystal display device as the modified example of the present invention, 16 registers from TXDLY1[3:0] to TXDLY16[3:0] are employed besides the registers 1051 and 1052 as shown in FIG. 4.

Assuming that the k is an integer ranging from 1 to 16 (1≤k≤16), and n is an integer equal to or larger than 0 (0≤n), the TXDLYk[3:0] sets the time width for delaying timing of supplying the touch panel scanning voltage (Vstc) to the scanning electrode (Tx) for the (k+16n) horizontal scanning period. That is, the TXDLYk[3:0] sets the value of the unit delay time (t_txdly) from the time point after an elapse of a predetermined waiting period (t_txwait) from the rising point of the horizontal synchronization signal (Hsync) to the timing of supplying the touch panel scanning voltage (Vstc) to the scanning electrode (Tx).

The noise source of the terminal which installs the generally employed touch panel may lessen the influence on the touch detection. Therefore, frequency for driving the electrodes (scanning electrode, detection electrode) of the touch panel is adjusted.

Meanwhile, the in-cell type liquid crystal display device having the touch panel function built in the liquid crystal display panel is configured to execute touch panel scanning using the timing at which the liquid crystal display panel is not driven in reference to the synchronization signal of the liquid crystal display panel for the purpose of avoiding influence of noise generated by the liquid crystal display panel. As a result, frequency for driving the touch panel depends on the frequency for driving the liquid crystal display panel, thus causing the problem of inability to freely adjust the frequency.

Both the in-cell type liquid crystal display device according to the present invention and the one as the modified example are allowed to freely adjust frequency for driving the touch panel. This makes it possible to lessen the influence of the noise source of the terminal that installs the touch panel on the touch detection.

However, upon input of the external noise at the noise frequency substantially equal to the integer multiple of the horizontal scanning frequency (external noise frequency≈integer multiple of horizontal scanning frequency), the integration circuit in the detection circuit may involve the integration error, resulting in the problem of generating the imaginary touch "ghost".

Figure 20:
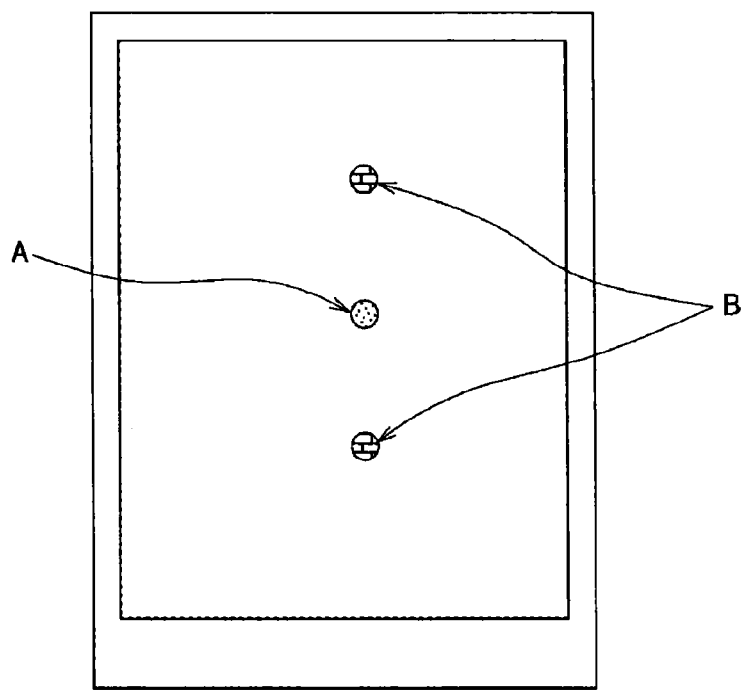
FIG. 20 is an explanatory view of an imaginary touch "ghost" on the touch panel, which occurs at a position different from the touch position.

For example, if the low-cost charger is connected to the mobile terminal equipped with the touch panel as shown in FIG. 20, noise generated from the charger, in other words, AC charger noise may induce the imaginary touch "ghost" (the mark B of FIG. 20) at positions different from the touched position (mark A of FIG. 20). As the AC charger noise is an in-phase noise, the problem of such error detection does not occur in the untouched state even in charging.

First Embodiment

The in-cell type liquid crystal display device according to the embodiment is configured to identify the aforementioned imaginary touch "ghost", and to lessen the influence of such imaginary touch "ghost" on the touch detection. The structure of the in-cell type display device according to the embodiment is basically the same as that of the device shown in FIGS. 1 to 4, and 7 besides the part corresponding to the one shown in FIG. 14.

Figure 14:
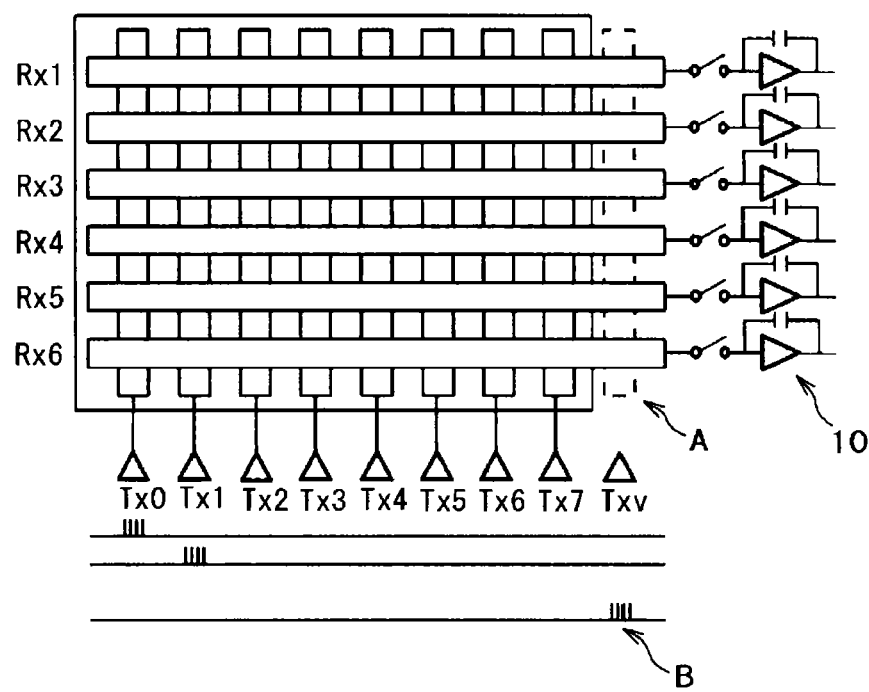
FIG. 14 is an explanatory view representing the method of detecting noise of the touch panel in the in-cell type liquid crystal display device according to the first embodiment.
Figure 15:
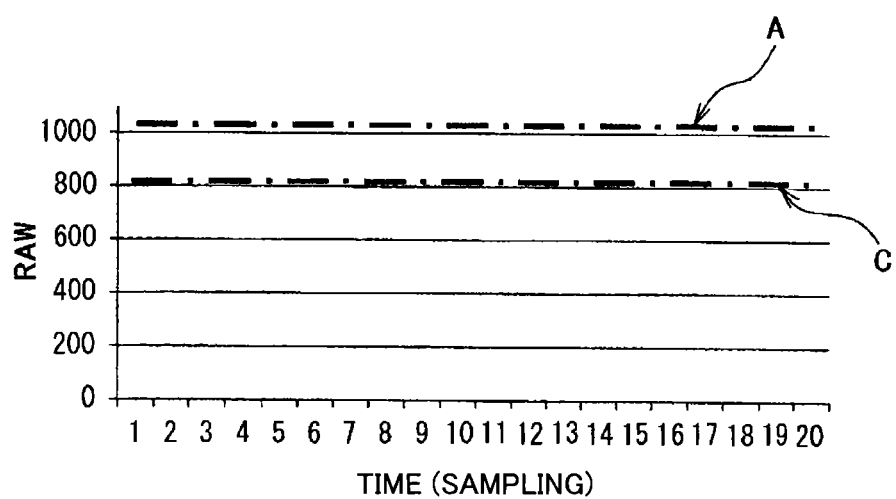
FIG. 15 is a graph representing RAW data through the touch panel noise detection method according to the first embodiment, having no noise detected by the detection electrode.
Figure 16:
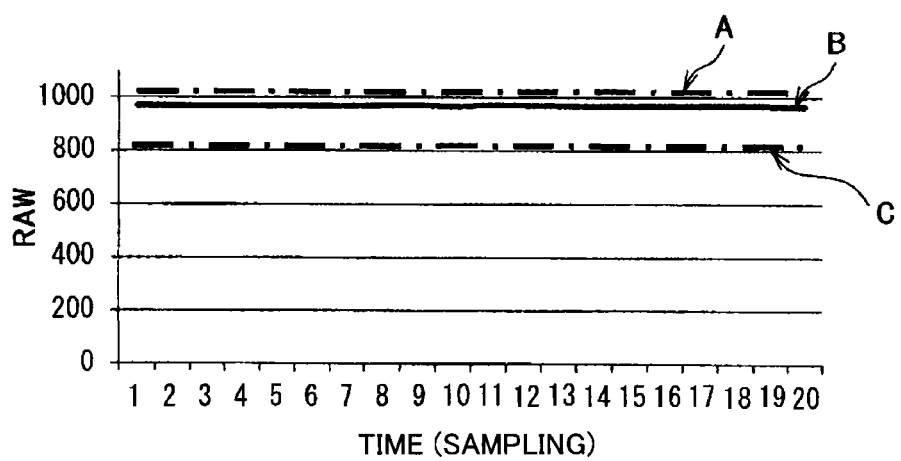
FIG. 16 is a graph showing RAW data of noise detected by the detection electrode through the touch panel noise detection method according to the first embodiment, the noise frequency of which is other than the integer multiple of horizontal scanning frequency (external noise frequency integer multiple of horizontal scanning frequency)
Figure 17:
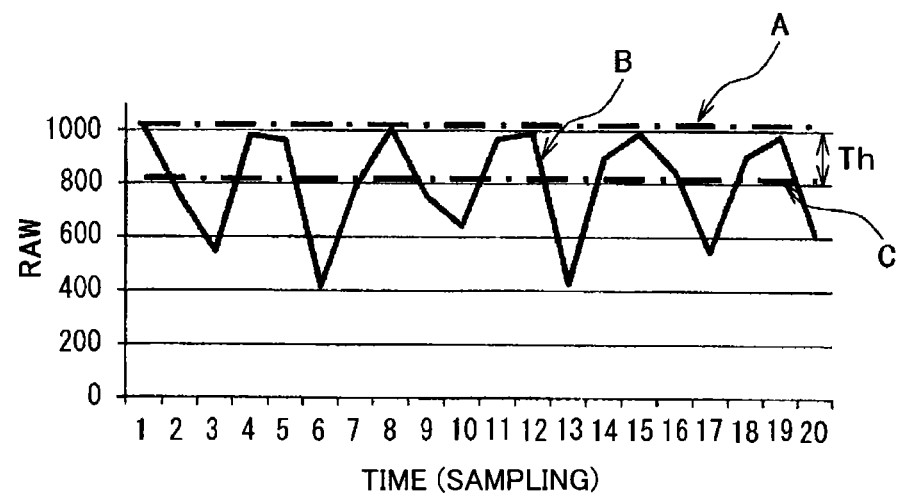
FIG. 17 is a graph showing RAW data of noise detected by the detection electrode through the touch panel noise detection method according to the first embodiment, the noise frequency of which is substantially equal to the integer multiple of horizontal scanning frequency (external noise frequency integer multiple of horizontal scanning frequency)

FIG. 14 is an explanatory view representing the touch panel noise detection method in the case of the in-cell type liquid crystal display device according to the first embodiment. FIG. 15 is a graph representing the RAW data detected by the detection electrode through the touch panel noise detection method according to the first embodiment in the case of no noise. FIG. 16 is a graph representing the RAW data detected by the detection electrode in the presence of noise through the touch panel noise detection method according to the first embodiment, the noise frequency of which is not the integer multiple of the horizontal scanning frequency. FIG. 17 is a graph representing the RAW data detected by the detection electrode through the touch panel noise detection method according to the first embodiment, the noise frequency of which is substantially equal to the integer multiple of the horizontal scanning frequency.

It is assumed that the imaginary counter electrode (Txv) exists as indicated by the line A of FIG. 14 in contrast to the actual scanning electrodes (tx0 to Tx7) of the touch panel, and the touch panel scanning voltage is supplied to the imaginary counter electrode (Txv), which is in synchronization with the touch panel scanning voltage (Vstc) supplied to the actual scanning electrodes (Tx0 to Tx7) of the touch panel as indicated by the line B of FIG. 14. On the assumption as described above, noise is detected based on the current flowing through a plurality of detection electrodes (Rx1 to Rx6).

It is assumed that the touch panel scanning voltage (Vstc) is not supplied to the imaginary counter electrode (Txv), which is output from the touch panel scanning voltage generation circuit 103 shown in FIG. 2.

The integration circuit 10 is activated to detect noise in synchronization with the imaginary touch panel scanning voltage (Vstc) to the imaginary counter electrode (Txv).

As FIG. 15 shows, in the absence of noise, there is no charge flowing into the integration circuit 10. So the output voltage (VINT) of the integration circuit 10 is maintained at the reference voltage (VREF) of 4V. Therefore, the value of the RAW data provided by the AD converter 12 for AD conversion of the output voltage (VINT) from the integration circuit 10 becomes 1023 in decimal system as the operating point in noise detection as indicated by the line A of FIG. 15. The line C of FIG. 15 is a threshold (Th) line for noise determination. If the decimal value of the RAW data provided by the AD converter 12 for AD conversion of the output voltage (VINT) of the integration circuit 10 is under the line of the threshold value (Th) for noise determination, it is determined to have noise. Numbers along the x-axis of the single memory for each graph shown in FIGS. 15, 16, 17, 18A, 18B, 24, and 25 denote the number of times of sampling and holding executed by the sample hold circuit 11.

Referring to FIG. 16, if the frequency of noise is the value other than the integral multiple of the horizontal scanning frequency (external noise frequency≠integral multiple of horizontal scanning frequency), the charge flows into the integration circuit 10. However, it is offset in integral accumulation by the integration circuit 10, and as a result, the output voltage (VINT) of the integration circuit 10 is retained substantially at 4V as the reference voltage (VREF). Therefore, as the line B of FIG. 16 indicates, the value of the RAW data provided by the AD converter 12 for AD conversion of the output voltage (VINT) of the integration circuit 10 is retained as the decimal value around 1023.

Referring to FIG. 17, if the noise frequency is substantially equal to the integer multiple of the horizontal scanning frequency (external noise frequency≈integer multiple of horizontal scanning), the charge inflow direction to the integration circuit 10 is inclined to a specific side, resulting in significant change in the output voltage (VINT) of the integration circuit 10. As a result, as the line C of FIG. 17 indicates, the RAW data value derived from the AD converter 12 for AD conversion of the output voltage (VINT) of the integration circuit 10 largely changes.

Taking the decimal value 1023 as the operating point, if the decimal value of the RAW data derived from the AD converter 12 for AD conversion of the output voltage (VINT) of the integration circuit 10 is under the threshold (Th) line for noise determination as indicated by the line C of FIG. 17, it is determined to have noise.

As FIG. 17 shows, if it is determined to have noise, the imaginary touch "ghost" is identified.

The imaginary touch "ghost" is identified based on the different RAW data operating point. In other words, the averaging filter is applied to the RAW data so as to extract the RAW data operating point.

FIGS. 18A and 18B are graphs representing RAW data of the detection electrode with detected noise, and RAW data derived after application of average filtering on the touch panel according to the first embodiment.

The AC charger noise is set as a premise of the embodiment. The imaginary touch "ghost" caused by the AC charger noise is generated on the same detection electrode. Therefore, graphs of FIGS. 18A and 18B indicate the case where the noise is detected from the detection electrode of Rx6 as shown in FIG. 14.

Referring to FIGS. 18A and 18B, the Tx0 to Rx6 represents the RAW data derived from the detection electrode Rx6 upon application of the touch panel scanning voltage (Vstc) to the scanning electrode Tx0.

Likewise, the Tx1_Rx6 represents the RAW data derived from the detection electrode Rx6 upon application of the touch panel scanning voltage (Vstc) to the scanning electrode Rx6. The Tx2_Rx6 represents the RAW data derived from the detection electrode Rx6 upon application of the touch panel scanning voltage (Vstc) to the scanning electrode Tx2. The Tx3_Rx6 represent the RAW data derived from the detection electrode Rx6 upon application of the touch panel scanning voltage (Vstc) to the scanning electrode Tx3. The Tx4_Rx6 represents the RAW data derived from the detection electrode Rx6 upon application of the touch panel scanning voltage (Vstc) to the scanning electrode Tx4. The Tx5_Rx6 represents the RAW data derived from the detection electrode Rx6 upon application of the touch panel scanning voltage (Vstc) to the scanning electrode Tx5. The Tx6_Rx6 represents the RAW data derived from the detection electrode Rx6 upon application of the touch panel scanning voltage (Vstc) to the scanning electrode Tx6. The Tx7_Rx6 represents the RAW data derived from the detection electrode Rx6 upon application of the touch panel scanning voltage (Vstc) to the scanning electrode Tx7.

FIG. 18B show the RAW data acquired after application of average filtering of the RAW data shown in the graph of FIG. 18A.

Referring to FIG. 18B, the electrode (scanning electrode that intersects the detection electrode Rx6) at the operating point with the maximum value among the RAW data at the time point when the noise is detected will be determined as the actually touched electrode. The electrode at the operating point under the ghost determination threshold value (Th1) is identified as the ghost. Referring to FIG. 18B, the line A indicates the actually touched electrode (Tx4_Rx6), the line B indicates the electrode (Tx5_Rx6) adjacent to the touched electrode, and the line C indicates the electrode where the imaginary touch "ghost" is generated.

Figure 19:
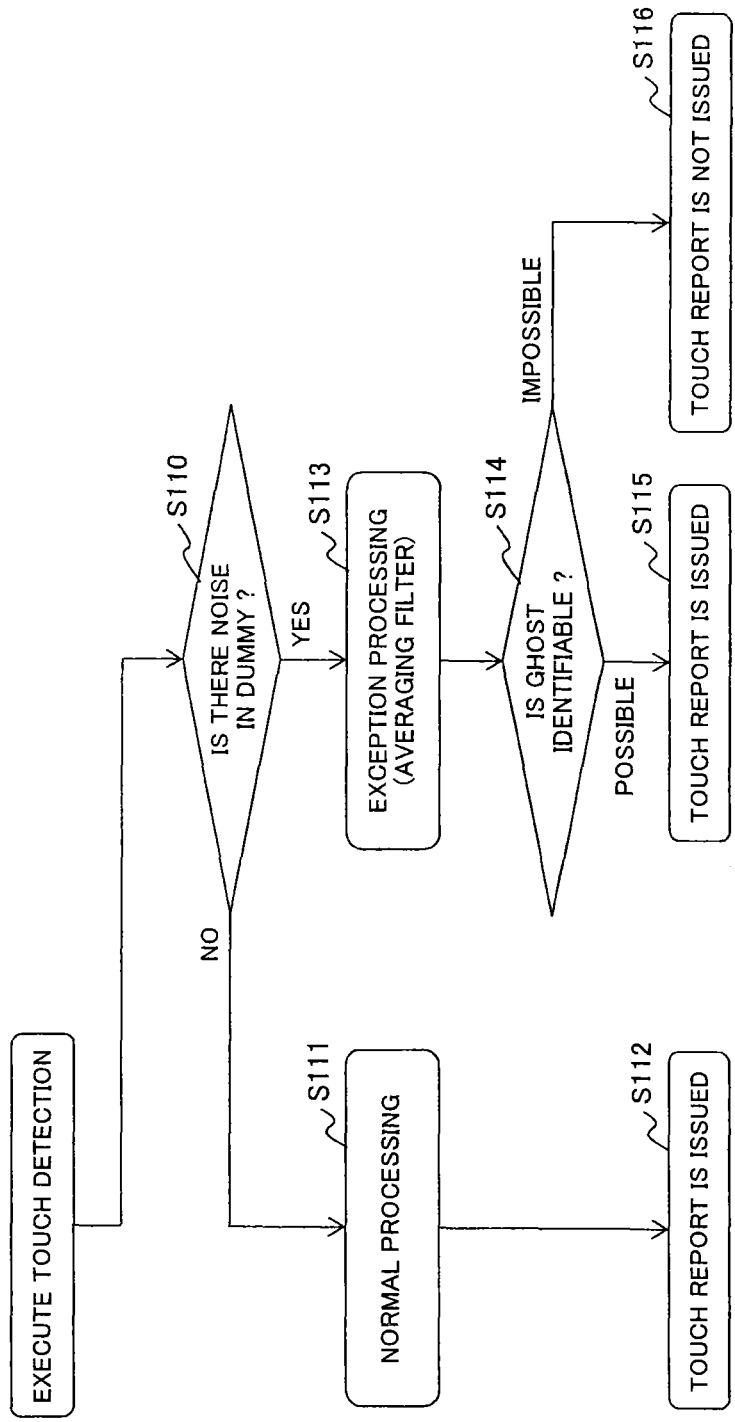
FIG. 19 is a flowchart representing process steps of detecting a touch position of the in-cell type liquid crystal display device according to the first embodiment.

FIG. 19 is a flowchart that represents the process for detecting the touch position of the liquid crystal display device according to the first embodiment.

Upon execution of the touch position detection process, the integration circuit 10 is activated in synchronization with the imaginary touch panel scanning voltage (Vstc) corresponding to the imaginary counter electrode (Txv) to determine whether or not noise exists (step S110).

If it is determined to have no noise in step S110, the normal touch position detection process is executed in step S111, and coordinates of the touch position will be reported in step S112.

If it is determined to have noise in step S110, the exceptional process (average filtering) is executed in step S113, and it is determined in step S114 whether or not the imaginary touch "ghost" is identifiable.

If it is determined that the imaginary touch "ghost" is identifiable in step S114, the touch position detection process is executed to report the touch position coordinates in reference to the information on the imaginary touch "ghost" in step S115.

If it is determined that the imaginary touch "ghost" is not identifiable in step S115, the touch position detection is not executed, and the touch position coordinates are not reported in step S116.

The program corresponding to the flowchart shown in FIG. 19 is stored in the storage device such as the flash memory in the detection circuit 108 so that the central processing unit (CPU) in the detection circuit 108 executes the program in reference to the RAW data in the memory 13.

The above-described first embodiment will be summarized in items from (A1) to (A7) as follows.

(A1) The liquid crystal display device has the liquid crystal display panel which includes a first substrate (2), a second substrate (3), and a liquid crystal (4) interposed between the first substrate (2) and the second substrate (3) as well as a plurality of pixels (200) arranged in matrix.

The second substrate (3) includes a plurality of detection electrodes (Rx) of the touch panel.

Each pixel (200) includes a pixel electrode and a counter electrode (21).

Assuming that m is an integer equal to or larger than 2 (m≥2), the counter electrode (21) is divided into m blocks.

Each of m divided blocks of the counter electrode (21) is commonly provided for each pixel on a plurality of consecutive display lines.

The m divided block of the counter electrode (21) serves as the scanning electrode (Tx) of the touch panel.

The liquid crystal display device includes a drive circuit (5) for supplying the counter voltage and the touch panel scanning voltage (Vstc) to the m divided blocks of the counter electrode (21, Tx), and a detection circuit (108) for detecting presence or absence of touch based on the current flowing to a plurality of detection electrodes (Rx).

The drive circuit (5) sequentially supplies the touch panel scanning voltage (Vstc) to the m divided blocks of the counter electrode (21, Tx).

The detection circuit (108) is configured to detect presence or absence of touch based on the current flowing through a plurality of detection electrodes (Rx) upon application of the touch panel scanning voltage (Vstc) to the respective m divided blocks of the counter electrode (21, Tx) (normal detection). It is further configured to detect noise based on the current flowing through a plurality of detection electrodes (Rx) assuming that the (m+1)th counter electrode (Txv) exits in addition to the m divided blocks of the counter electrode (21), and the touch panel scanning voltage is supplied to the (m+1)th counter electrode (Txv), which is in synchronization with the touch panel scanning voltage (Vstc) supplied to the m divided blocks of the counter electrode (21, Tx).

(A2) The detection circuit (108) includes a plurality of integration circuits (10) provided for a plurality of detection electrodes (Rx), and the AD converter (12) for converting the output voltage of the integration circuits (10) into digital data.

Upon supply of the touch panel scanning voltage (Vstc) to the m divided blocks of the counter electrode (21, Tx), and supply of the imaginary touch panel scanning voltage (Vstc) to the (m+1)th imaginary counter electrode, the respective integration circuits (10) integrate the current flowing through the respective detection electrodes (Rx) for the m divided blocks of the counter electrode (21, Tx) and the (m+1)th imaginary counter electrode (Txv).

(A3) In the (normal detection), the value closer to the least significant data than the intermediate value between the least significant data and the most significant data among digital data converted by the AD converter (12) is set as the first operating point. The integral value for each of the m divided blocks of the counter electrodes (21, Tx) in a plurality of integration circuits (10) is converted by the AD converter (12) into digital data. In the case where the value of the resultant digital data is in the range from the first operating point and the most significant data, and the difference between such value and the first operating point is larger than a predetermined threshold value 1, it is determined to have touch. Otherwise, it is determined to have no touch.

(A4) In the (noise detection), the most significant data (the line A of FIG. 17) among the digital data converted by the AD converter (12) is set as a second operating point. Then the integral value of the (m+1)th imaginary counter electrode (Txv) of a plurality of integration circuits (10) is converted by the AD converter (12) into digital data. In the case where the value of the resultant digital data is in the range from the second operating point and the least significant data, and the difference between such value and the second operating point is larger than a predetermined threshold value 2 (line C (Th) of FIG. 17), it is determined to have noise.

(A5) The digital data converted by the AD converter (12) is of 10-bit type. The first operating point is a decimal value in the range from 250 to 350. The second operating point is a decimal value close to 1023.

(A6) If noise is detected in the (noise detection) for (imaginary touch identification), the detection circuit (108) is configured to identify the imaginary touch caused by the noise.

In the (imaginary touch identification), the average filtering is applied to the digital data derived from the AD converter (12) for converting the integral values for the m divided blocks of the counter electrode (21, Tx) of the integration circuit (10) corresponding to the detection electrode (Rx) with noise detected in the (noise detection). The electrode with the maximum data value (line A of FIG. 18B) among the average filtered data as an actually touched electrode. If the data value is in the range between the maximum value (line A of FIG. 18B), and the difference between the value and the maximum value (line A of FIG. 18B) is larger than a predetermined threshold value 3 (Th1), the electrode is identified as the imaginarily touched electrode.

(A7) In the touch detection process, if noise is not detected in the (noise detection), the normal touch position detection process is executed.

If the imaginary touch caused by the noise detected by the (noise detection) is identifiable upon noise detection, the touch position detection process is executed in reference to the imaginary touch identified by the (imaginary touch identification).

If the (imaginary touch identification) determines that the imaginary touch owing to the noise detected in the (noise detection) is not identifiable, the touch position detection process is not executed.

In accordance with the above-described embodiment, use of only software ensures to lessen the influence of the imaginary touch "ghost" caused by erroneous integration of the integration circuit in the detection circuit owing to external noise with frequency substantially equal to integer multiple of the horizontal scanning frequency (external noise frequency≈integer multiple of horizontal scanning frequency) with no additional hardware.

It is possible to further lessen the influence of noise by combining the in-cell type liquid crystal display device according to the present invention and the technique to "freely adjust the drive frequency of the touch panel" as the modified example of the in-cell type liquid crystal display device. However, it is also possible to apply the embodiment to the generally employed in-cell type liquid crystal display device.

Second Embodiment

Figure 21:
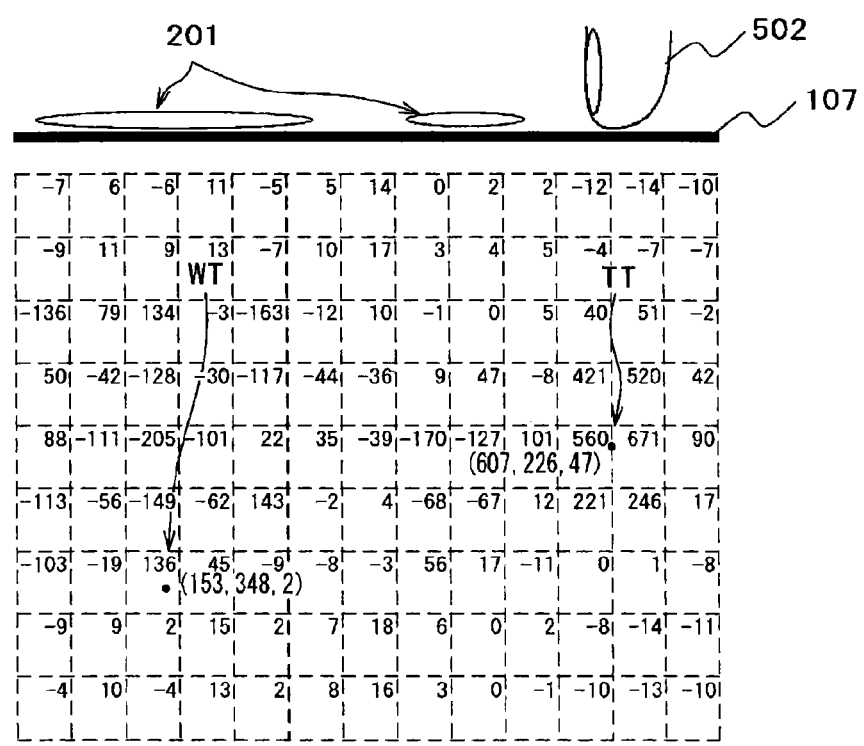
FIG. 21 is a view representing the touch reaction in the presence of water droplets.
Figure 22:
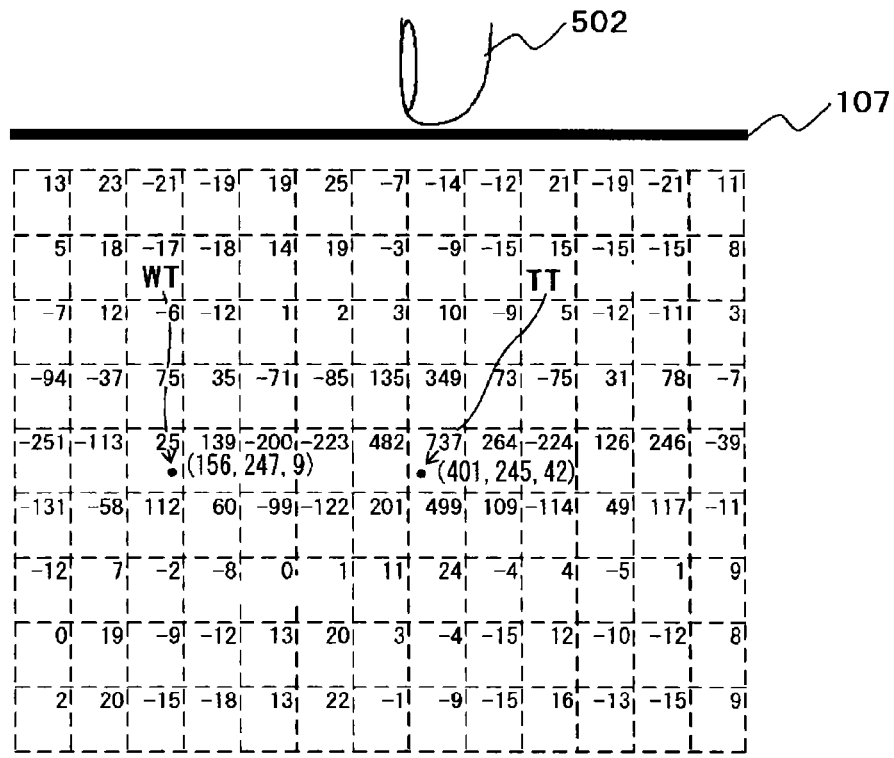
FIG. 22 is a view representing the touch reaction in the presence of external noise.

The touch response in the case of water droplet and external noise will be described referring to FIGS. 21 and 22. FIG. 21 represents the touch response in the case of water droplet, and FIG. 22 represents the touch response in the case of external noise. Each grid represents the intersection area between the scanning electrode and the detection electrode. The number in the grid denotes the touch strength which is expressed as the relative value with respect to the reference value. The large positive number indicates the strong touch. If the touch panel 107 is not touched by a finger 502, and is not exposed to noise nor water droplet adhesion, the resultant value is expressed to be close to 0. Three numbers in parentheses indicate the X and Y coordinates, and the touch strength at the touch position, respectively. For example, with respect to numbers (607, 226, 47), "607" denotes the X coordinate at the touch position, "226" denotes the Y coordinate at the touch position, and "47" denotes the touch strength.

FIG. 21 shows large numbers at the area TT (actually touched position) indicating the position of the touch panel 107 touched by the finger 502, and at the imaginary touch area WT around water droplets 201 that stick to the touch panel 107. The number corresponding to the actual touch TT is larger than the number corresponding to the imaginary touch WT. FIG. 22 shows large numbers corresponding to the touch (actual) of the finger 502 to the touch panel 107, and corresponding to the imaginary touch WT owing to the external noise. The number corresponding to the actual touch TT is larger than the number corresponding to the imaginary touch WT.

The water droplet which adheres to the touch panel of the in-cell type display device shows the similar tendency to the external noise as shown in FIGS. 21 and 22 in comparison with the temporary detection data. The external noise is not influential so long as the touch panel is not touched. On the contrary, the water droplet causes the imaginary touch even if the touch panel is not touched, resulting in the circumstance of missing the touch report. It is therefore necessary to distinguish the water droplet from the external noise so as to separately execute the corresponding processing.

If the determination is made using only detection data of the scanning electrode (normal electrode) of the touch panel, a certain size of the detection data on the entire surface of the panel is accumulated for analysis. This may complicate the algorithm, resulting in high load as well as the problem of touch report delay.

Figure 23:
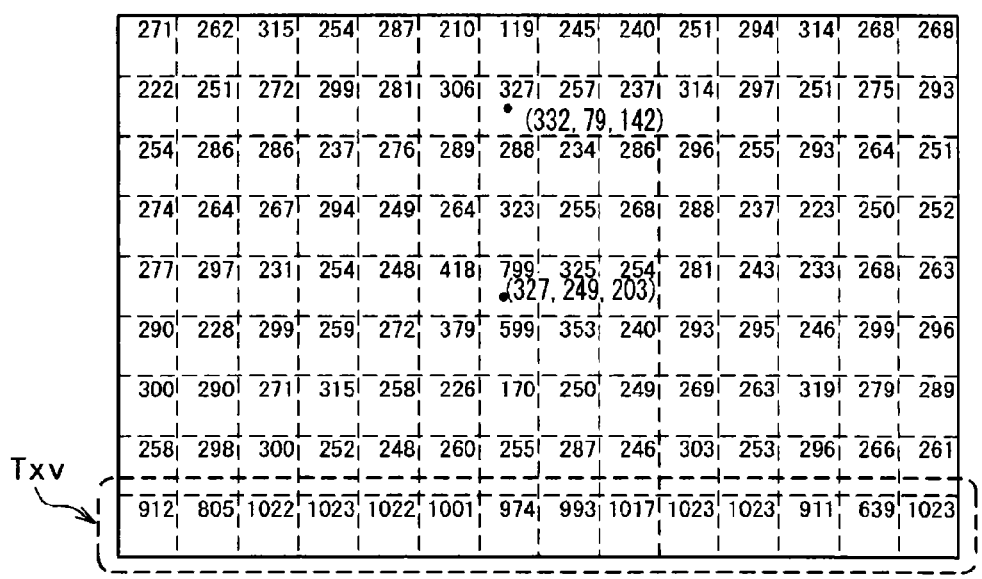
FIG. 23 is a view representing the RAW data distribution derived from the imaginary electrode.
Figure 24:
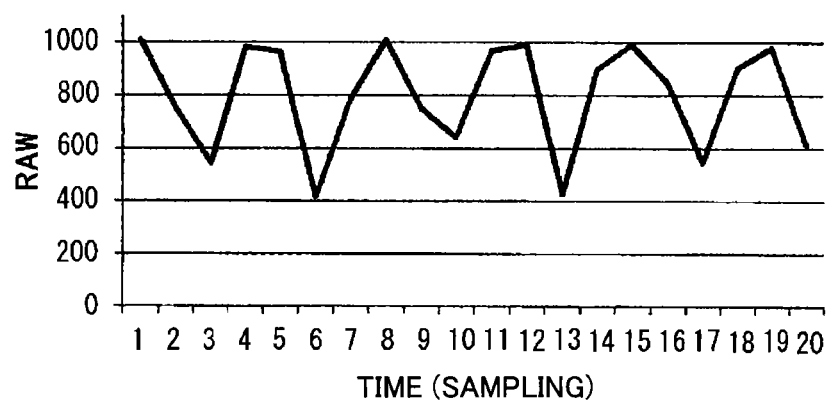
FIG. 24 is a view representing change in the RAW data of the imaginary electrode upon generation of the external noise.
Figure 25:
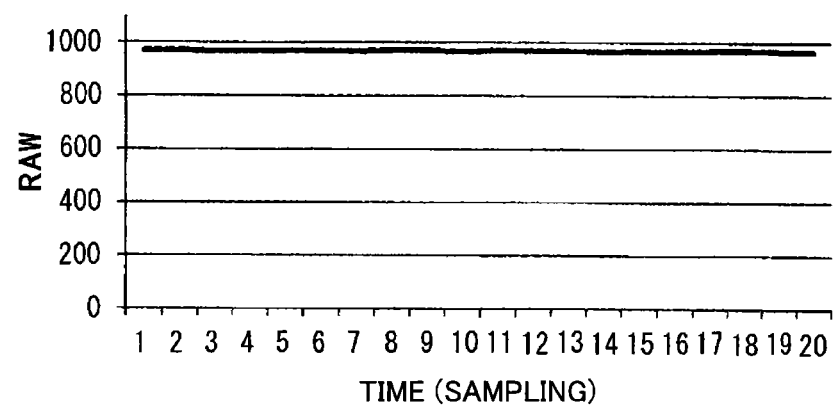
FIG. 25 is a view representing change in the RAW data of the imaginary electrode upon water droplet adhesion.

In the second embodiment, the external noise is distinguished from the water droplet by applying the process of detecting the external noise using the imaginary counter electrode (imaginary electrode) as described in the first embodiment. The principle of distinction between external noise and water droplet will be described referring to FIGS. 23 to 25. The in-cell type display device of this embodiment basically has the same structure as the one according to the first embodiment. FIG. 23 represents the RAW data distribution of the imaginary electrode. FIG. 24 represents change in the RAW data of the imaginary electrode upon generation of external noise. FIG. 25 represents change in the RAW data of the imaginary electrode upon water droplet adhesion. The number in the grid denotes the RAW data expressed in the range from 0 to 1023. The larger the number becomes, the higher the touch strength becomes. Three numbers in the parentheses denote X and Y coordinates of the touch position, and the touch strength, respectively. If no noise exists in the RAW data of the imaginary electrode (Txv), the number approaches the value of 1023.

The external noise and the water droplet will be detected on the normal electrode (Tx) as characteristic data (small value of detection data). Referring to FIGS. 24 and 25, the external noise may change data of the imaginary electrode (Txv). On the contrary, water droplet adhesion does not change data of the imaginary electrode (Txv).

This allows easy distinction between external noise and water droplet by monitoring values of the normal electrode (Tx) and the imaginary electrode (Txv). The process separately executed in accordance with the distinction makes it possible to cope with the task of the touch report.

Figure 26:
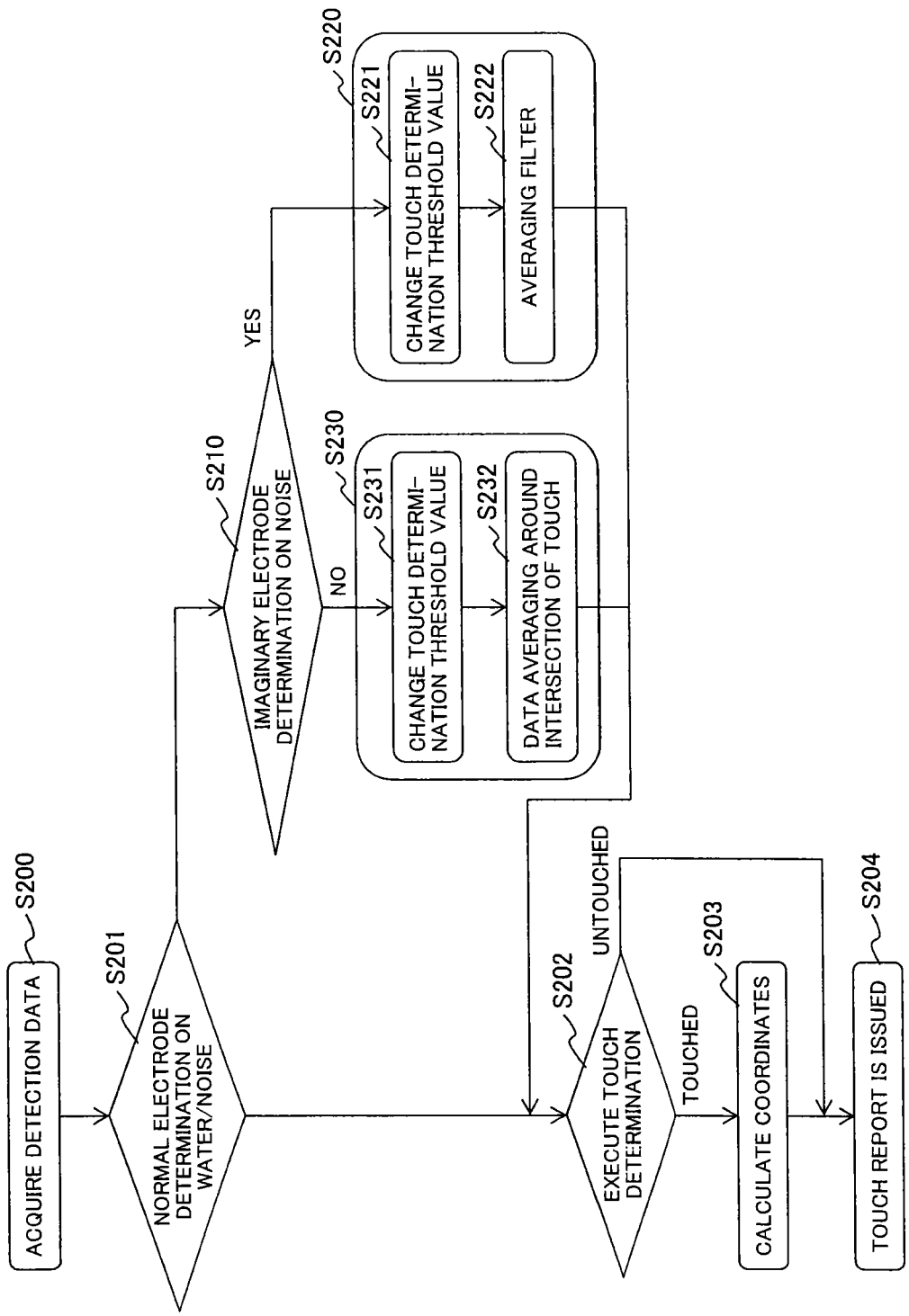
FIG. 26 is a flowchart of process steps for detecting the touch position of a display device according to a second embodiment.

The touch position detection process steps according to the second embodiment will be described referring to FIG. 26. FIG. 26 is a flowchart of the process for touch position detection of the display device according to the second embodiment. The program corresponding to the flowchart of FIG. 26 is stored in the storage device such as the flash memory in the detection circuit 108. The program is executed by the central processing unit (CPU) in the detection circuit 108 in reference to the RAW data in the memory 13.

In step S200, the detection data are acquired, and the RAW data are stored in the memory 13. In step S201, a determination is made with respect to detection data of the normal electrode. The determination with respect to the detection data of the normal electrode is made by detecting presence or absence of noise or water droplet adhesion based on the current flowing through a plurality of detection electrodes upon supply of the touch panel scanning voltage to the m divided blocks of the counter electrode. The detection is executed based on the characteristic RAW data generated resulting from the water droplet or external noise. If the water droplet or the external noise is generated, the detection data become small. In other words, it is determined with respect to presence or absence of the detection data on the normal electrode, which are below the threshold value for water droplet-noise determination. In the case of "detection data<threshold value for water droplet-noise determination", the process proceeds to step S210 where the noise determination is made with respect to the imaginary electrode. In step S202, the touch detection is executed. In the case of "detection data>touch determination threshold value", it is determined to be touched. The process then proceeds to step S203 to calculate the touch coordinates. In the case of "detection data<touch determination threshold value", it is determined to have no touch. Then the touch coordinates are cleared to proceed to step S204. In step S204, information of the touch coordinates is reported to the host.

In step S210, the detection data of the imaginary electrode are subjected to the determination whether or not the noise exists. The determination of detection data of the imaginary electrode is made to distinguish between noise and water droplet based on the current flowing through a plurality of detection electrodes on the assumption that the (m+1)th counter electrode exists in addition to the m divided blocks of the counter electrode, and the touch panel scanning voltage is supplied to the (m+1)th counter electrode, which is in synchronization with the touch panel scanning voltage supplied to the m divided blocks of the counter electrode. The RAW data of the imaginary electrode change depending on the water droplet and the external noise as shown by FIGS. 24 and 25. If it is determined to have noise generated, the process proceeds to step S220 where the noise processing is executed. The determination with respect to the noise is executed in the same way as the one described in the first embodiment referring to FIGS. 14 to 17. If it is determined to have no noise, the process proceeds to step S230 where the water droplet processing is executed.

The noise processing executed in step S220 will be described referring to FIGS. 18A and 18B. The process is executed utilizing the difference in the operating point of the RAW data between the actual touch and noise. In step S221, the touch determination threshold value used for the touch determination (step S202) is changed. The thus changed touch determination threshold value will be referred to as a ghost determination threshold value (Th1). In step S222, an arithmetic mean value of some frames (for example, 20 frames) is calculated with respect to the RAW data as shown in FIG. 18A (the operating point of the RAW data is extracted through average filtering). The obtained data are like the RAW data as shown in FIG. 18B. In the subsequent step S202, the touch determination is made using the ghost determination threshold value. The electrode having the operating point with maximum value among the RAW data (scanning electrode that intersects the detection electrode Rx6) is determined as the actually touched electrode. Then the electrode part with the operating point below the ghost determination threshold value is determined as the ghost. In the presence of a plurality of electrodes in excess of the ghost determination threshold value, if it is impossible to determine the actually touched electrode, it is determined that the ghost is not identifiable. Therefore, the touch report is not issued.

Figures 27, 28:
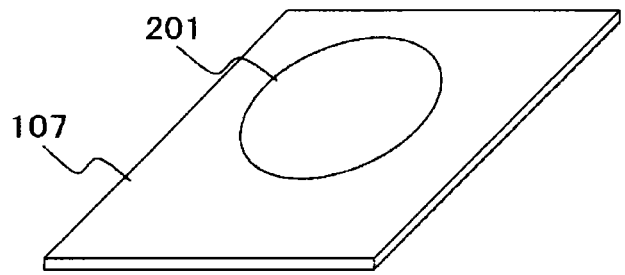
FIG. 27 is an explanatory view of the averaging process upon adhesion of only water droplet to the panel.
FIG. 28 is an explanatory view of the averaging process upon adhesion of only water droplet to the panel.
Figures 29, 30:
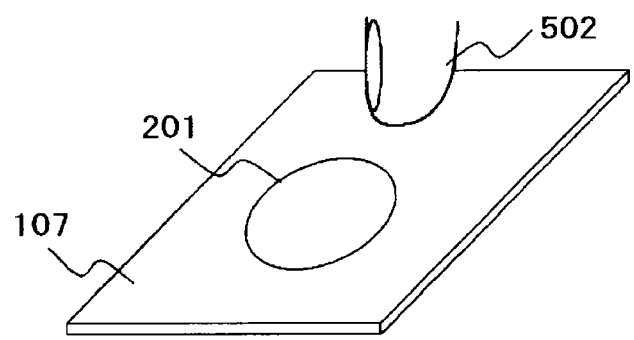
FIG. 29 is an explanatory view of the averaging process upon adhesion of only water droplet to the panel.
FIG. 30 is an explanatory view of the averaging process executed in the case where the panel to which the water droplet adheres is touched by the finger.

The water droplet process executed in step S230 will be described referring to FIGS. 27 to 32. FIGS. 27, 28 and 29 represent the averaging process corresponding to the state where only water droplet adheres to the panel will be described. FIGS. 30, 31 and 32 represent the averaging process corresponding to touch of the finger on the panel with water droplet. The RAW data of the area with the water droplet exhibit characteristics having the small value at the center of the water droplet, and large value at the peripheral area (imaginary touch). In step S231, the touch determination threshold value for the touch determination (step S202) is changed (the threshold value is increased). The thus changed touch determination threshold value will be referred to as the water droplet determination threshold value.

The following is the description on averaging of data around touch intersection, which is executed in step S232 in the state where only water droplet adheres to the panel as shown in FIG. 27. Referring to FIG. 28, points T1, T2 (intersection with touch response, maximum value) indicating the large RAW data exist around the water droplet. The value of the RAW data at the intersection T1 is 488, and the value of the RAW data at the intersection T2 is 560. Referring to FIG. 29, the arithmetic mean value of 9 points of the RAW data of the intersection T1 and a peripheral area AR1 (303, 338, 324, 398, 488, 370, 413, 382, 416) is approximately 381 which is smaller than the RAW data value of 488 at the intersection T1. Similarly, the arithmetic mean value of 9 points of the RAW data of the intersection T2 and a peripheral area AR2 (300, 347, 404, 553, 560, 314, 363, 376, 310) is approximately 392 which is smaller than the RAW data value 560 at the intersection T2. The RAW data at the area around the intersection where touch response occurs are small. Accordingly, the average peripheral data become small. In the subsequent step 202, the touch determination is made using the water droplet threshold value. As a result of the touch determination, the touch response at the intersections T1, T2 will be cancelled (determined to be untouched (NT)).

The following is the description on averaging of the data around the touch intersection, which is executed in step S232 in the case of water droplet adhesion to the panel touched with the finger as shown in FIG. 30. Referring to FIG. 31, points T3, T4 indicating large RAW data exist at the area touched with the finger and periphery of the water droplet (intersection with touch response, maximum value). The RAW data value at the intersection T3 is 1009, and the RAW data value at the intersection T4 is 528. Referring to FIG. 32, the arithmetic mean value of 9 points of the RAW data of the intersection T3 and a peripheral area AR3 (529, 781, 468, 626, 1009, 683, 358, 630, 440) is approximately 614 which is smaller than the RAW data value of 1009 at the intersection T3. Similarly, the arithmetic mean value of 9 points of the RAW data of the intersection T4 and a peripheral area AR4 (281, 324, 308, 262, 528, 295, 346, 283, 357) is approximately 332 which is smaller than the RAW data value of 528 at the intersection T4. The RAW data at the area around the intersection where touch response occurs are small. Accordingly, the average peripheral data become small. The water droplet determination threshold value is used for the touch determination in the next step 202. As the touch determination result, the touch response at the intersection T4 is canceled (untouched (NT)), and the response at the intersection T3 is only determined to be touched (TT).

The above-described second embodiment will be summarized in items from (B1) to (B10) as follows.
(B1) The display device has the first substrate (2) which includes a pixel electrode and a counter electrode (21), a second substrate (3) which includes a plurality of detection electrodes (31, Rx) of the touch panel, a liquid crystal (4) interposed between the first substrate (2) and the second substrate (3), a drive circuit (5) for supplying the counter voltage and the touch panel scanning voltage (Vstc) to the counter electrode (21), and a detection circuit (108) for detecting presence or absence of the touch based on the current flowing through a plurality of detection electrodes (Rx).

Assuming that m is an integer equal to or larger than 2 (m≥2), the counter electrode (21) is divided into m blocks.

Each of m divided blocks of the counter electrode (21) is commonly provided for each pixel (200) on a plurality of consecutive display lines.

The counter electrode (21) divided into m blocks serve as the scanning electrode (Tx) of the touch panel.

The drive circuit (5) sequentially supplies the touch panel scanning voltage (Vstc) to the respective m divided blocks of the counter electrode (Tx).

The detection circuit (108) is configured to detect presence or absence of either noise or water droplet adhesion based on the current flowing through a plurality of detection electrodes (Rx) upon supply of the touch panel scanning voltage (Vstc) to the respective m divided blocks of the counter electrode (Tx) (normal detection). It is further configured to distinguish between noise and water droplet based on the current flowing through the detection electrodes (Rx) assuming that the (m+1)th counter electrode (Txv) exist in addition to the m divided blocks of the counter electrode (21) in (noise detection), and the touch panel scanning voltage (Vstc) is supplied to the (m+1)th counter electrode (Txv), which is in synchronization with the touch panel scanning voltage (Vstc) supplied to the m divided blocks of the counter electrode (Tx).

(B2) The detection circuit (108) is configured to execute touch determination (S202) through the water droplet processing (S230) if it is determined to have water droplet in the (noise detection).

In the water droplet processing (S230), the process for averaging the touch intersection peripheral data (S232) is executed.

The detection circuit (108) is configured to execute the touch determination (S202) based on the first threshold value.

(B3) If it is determined to have noise in the (noise detection), the detection circuit (108) is configured to execute the touch determination (S202) through the noise processing (S220).

The noise processing (S220) is executed as the process for calculating the average value with respect to a plurality of frames.

The detection circuit (108) is configured to execute the touch determination (S202) based on the second threshold value.

(B4) The detection circuit (108) is configured to execute the touch determination (S202) based on the third threshold value if it is determined in the (normal detection) to have no noise nor water droplet.

(B5) The detection circuit (108) includes a plurality of integration circuits (10) provided for a plurality of detection electrodes (Rx), respectively and an AD converter (12) for converting the output voltage of the integration circuits (10) into digital data.

Upon supply of the touch panel scanning voltage (Vstc) to the m divided blocks of the counter electrode (Tx), and supply of the imaginary touch panel scanning voltage (Vstc) to the (m+1)th imaginary counter electrode (Txv), the respective integration circuits (10) are configured to integrate the current flowing through the respective detection electrodes (Rx) for the m divided blocks of the counter electrode (Tx) and the (m+1)th imaginary counter electrode (Txv), respectively.

(B6) In the (normal detection), the first operating point is set as the value closer to the least significant data than the intermediate value between the least significant data and the most significant data among the digital data which can be converted by the AD converter (12). If the difference between the first operating point and the digital data value derived from the AD converter (12) for converting the integral value for the m divided blocks of the counter electrode (Tx) of the integration circuits (10) is smaller than the predetermined third threshold value, it is determined to have noise or water droplet.

(B7) In the (noise detection), if the digital data value derived from the AD converter (12) for converting the integral value of the (m+1)th imaginary counter electrode (Txv) of the integration circuits (10) is in the range between the most significant data set as the second operating point (line A of FIG. 17) and the least significant data value, and the difference between the digital data value and the second operating point (line A of FIG. 17) is larger than a predetermined fourth threshold value (C(Th) of FIG. 17), it is determined to have noise.

(B8) The digital data converted by the AD converter (12) are 10-bit data.

The first operating point is the decimal value ranging from 250 to 350.

The second operating point (line A of FIG. 17) is close to the decimal value of 1023.

(B9) If it is determined to have the water droplet in the (noise detection), the detection circuit (108) is configured to calculate an average value of digital data converted by the AD converter (12) corresponding to electrodes (AR1, AR2, AR3, AR4) around the electrodes (T1, T2, T3, T4) indicating maximum digital data values converted by the AD converter (12), and the maximum value, and to further determine to have the touch if the data value after averaging is in the range between the first operating point and the maximum value, and the difference between the data value and first operating point is larger than a predetermined fifth threshold value. Otherwise, it is determined to have no touch.

There are eight peripheral electrodes (AR1, AR2, AR3, AR4) adjacent to the electrode indicating the maximum value. The average value is obtained by acquiring the arithmetic mean of nine digital data.

(B10) If it is determined to have noise in the (noise detection), the detection circuit (108) is configured to subject the digital data acquired by the AD converter (12) for converting the integral values for the respective m divided blocks of the counter electrode (Tx) in the integration circuit (10) corresponding to the detection electrode (Rx) with detected noise to the averaging filter, determine the electrode having the maximum data value (line A of FIG. 18) as the actually touched electrode among the data after application of the average filtering, and distinguish between the electrode with the data value that is in the range between the maximum value (line A of FIG. 18) and the least significant data value, and the difference from the maximum value (line A of FIG. 18) larger than a predetermined sixth threshold value (Th1) as the imaginarily touched electrode.

The average filtering provides the arithmetic mean value of the digital data of 20 frames.

The embodiment ensures to distinguish between external noise and water droplet adhesion through the simple algorithm (software), thus lessening the touch report delay. It is also possible to prevent erroneous touch report resulting from the water droplet.

It is possible to further lessen the influence of noise by combining the in-cell type liquid crystal display device according to the present invention and the technique to "freely adjust the drive frequency of the touch panel" as the modified example of the in-cell type liquid crystal display device. However, it is also possible to apply the embodiment to the generally employed in-cell type liquid crystal display device.

For convenience of explanation, the respective numbers of scanning electrodes (counter electrodes) and the detection electrodes as shown in the drawings are different. It is possible to set m scanning electrodes (m: integer equal to or larger than 2), and n detection electrodes (n: integer equal to or larger than 2).

What is claimed is:

1. A display device comprising:
   a first substrate having a pixel electrode and a counter electrode;
   a second substrate having a plurality of detection electrodes of a touch panel;
   a liquid crystal interposed between the first substrate and the second substrate;
   a drive circuit for supplying a counter voltage and a touch panel scanning voltage to the counter electrode; and
   a detection circuit for detecting presence or absence of a touch based on a current flowing through the detection electrodes, wherein:
   the counter electrode is divided into m blocks, where m is set to an integer equal to or larger than 2 (m≥2);
   the m divided blocks of the counter electrode are commonly provided to pixels on a plurality of consecutive display lines;
   the m divided blocks of the counter electrode serve as scanning electrodes of the touch panel;
   the drive circuit sequentially supplies the touch panel scanning voltage to the m divided blocks of the counter electrode;
   the detection circuit is configured to:
   (a) detect presence or absence of noise or water droplet adhesion based on the current flowing through the detection electrodes upon supply of the touch panel scanning voltage to the m divided blocks of the counter electrode; and
   (b) distinguish between noise and water droplet based on the current flowing through the detection electrodes on the assumption that a (m+1)th counter electrode exists in addition to the m divided blocks of the counter electrode, and the touch panel scanning voltage is supplied to the (m+1)th counter electrode, which is in synchronization with the touch panel scanning voltage supplied to the m divided blocks of the counter electrode.

2. The display device according to claim 1, wherein the detection circuit is configured to make a touch determination by executing a water droplet processing if it is determined to have the water droplet as a result of the distinction between noise and water droplet.

3. The display device according to claim 2, wherein the water droplet processing is executed to average touch intersection peripheral data.

4. The display device according to claim 3, wherein the detection circuit is configured to make the touch determination based on a first threshold value.

5. The display device according to claim 1, wherein the detection circuit is configured to make the touch determination by executing a noise processing if it is determined to have the noise as a result of the distinction between noise and water droplet.

6. The display device according to claim 5, wherein the noise processing is executed to calculate an average value of a plurality of frames.

7. The display device according to claim 6, wherein the detection circuit is configured to make the touch determination based on a second threshold value.

8. The display device according to claim 1, wherein the detection circuit is configured to make the touch determination based on a third threshold value if it is determined to have no noise nor water droplet as a result of the detection with respect to presence or absence of noise or water droplet.

9. The display device according to claim 1,
   wherein the detection circuit includes a plurality of integration circuits provided for the respective detection electrodes, and an AD converter for converting each output voltage of the integration circuits into digital data;
   the integration circuit is configured to integrate the current flowing through the respective detection electrodes for the m divided blocks of the counter electrode and an imaginary (m+1)th counter electrode upon supply of the touch panel scanning voltage to the in divided blocks of the counter electrode and supply of an imaginary touch panel scanning voltage to the imaginary (m+1)th counter electrode;
   upon detection with respect to presence or absence of noise or water droplet, a value closer to least significant data than an intermediate value between the least significant data and most significant data is set to a first operating point among the digital data allowed to be converted by the AD converter, and the detection circuit is configured to determine to have noise or water droplet if a difference between a digital data value derived from the AD converter for converting an integral value for the m divided blocks of the counter electrode of the integration circuits, and the first operating point is smaller than a predetermined third threshold value; and
   upon distinction between noise and water droplet, the detection circuit is configured to determine to have the noise if the digital data value derived from the AD converter for converting the integral value of the imaginary (m+1)th counter electrode of the integration circuits is in a range between the most significant data set as a second operating point and the least significant data, and if a difference between the value and the second operating point is larger than a predetermined fourth threshold value.

10. The display device according to claim 9,
    wherein the digital data converted by the AD converter are 10-bit data;
    the first operating point is a decimal value ranging from 250 to 350, and
    the second operating point is a decimal value close to 1023.

11. The display device according to claim 9, wherein upon distinction between noise and water droplet, if it is determined to have the water droplet, the detection circuit is configured to average a maximum value and the digital data converted by the AD converter corresponding to a peripheral electrode of the electrode having the digital data converted by the AD converter as a maximum value, and to determine to have a touch if the averaged data value is in a range between the first operating point and the maximum value, and a difference between the data value and the first operating point is larger than a predetermined fifth threshold value, and to further determine to have no touch otherwise.

12. The display device according to claim 11, wherein eight electrodes adjacent to the electrode with the maximum value constitute peripheral electrodes, and the average is calculated by obtaining an arithmetic mean of nine digital data.

13. The display device according to claim 9, wherein upon distinction between noise and water droplet, if it is determined to have the noise, the detection circuit is configured to apply average filtering to the digital data acquired by the AD converter for converting the integral value for the respective m divided blocks of the counter electrode of the integration circuit corresponding to the detection electrode having the noise detected, to determine the electrode with the maximum data value among those subjected to the average filtering as an actually touched electrode, and to distinguish between the imaginarily touched electrode and the electrode having the data value in a range between the maximum value and the least significant data, and a difference between the data value and the maximum value, which is larger than a predetermined sixth threshold value.

14. The display device according to claim 13, wherein an arithmetic mean of the digital data of 20 frames is acquired by applying the average filtering.

15. A display device comprising:
a first substrate having a pixel electrode and a counter electrode;
a second substrate having a plurality of detection electrodes;
a liquid crystal interposed between the first substrate and the second electrode;
a drive circuit for supplying a counter voltage and a scanning voltage; and
a detection circuit for making a touch determination based on a signal generated in the detection electrodes, wherein:
the counter electrode is divided into m blocks, where m is set to an integer equal to or larger than 2 (m≥2);
the counter electrode is commonly provided to the pixel electrodes;
the drive circuit supplies the scanning voltage to the counter electrode in a detection period;
the detection circuit is configured to detect a signal generated in the detection electrode in the detection period at m cycles and a subsequent noise detection period,
the touch determination is made based on a first threshold value and a second threshold value, which are selectively used in accordance with a detection result in the noise detection period,
the detection circuit includes a plurality of integration circuits provided for the respective detection electrodes, and an AD converter for converting output voltages of the integration circuits into digital data, and
the respective integration circuits integrate the voltage generated by current flowing through the detection electrodes in the detection period and a noise detection period,
the AD converter outputs digital data having a least significant value and a most significant value,
the integration circuit has a first operating point in the detection period, and
a value of the digital data at the first operating point is closer to the least significant value than an intermediate value between the least significant value and the most significant value.

16. The display device according to claim 15,
wherein the detection period at m cycles constitutes 1 frame period, and
an average value of a plurality of data in the same frame period is calculated in accordance with the touch determination based on the first threshold value.

17. The display device according to claim 15,
wherein the detection period at m cycles constitutes 1 frame period, and
an average value of data of a plurality of frames is calculated in accordance with the touch determination based on the second threshold value.

18. The display device according to claim 15,
wherein the AD converter outputs digital data having a least significant value and a most significant value;
the integration circuit has a second operating point in the noise detection period, and
the digital data at the second operating point is the most significant value.

* * * * *